United States Patent [19]

O'Dowd et al.

[11] 4,412,286
[45] Oct. 25, 1983

[54] TIGHTLY COUPLED MULTIPLE INSTRUCTION MULTIPLE DATA COMPUTER SYSTEM

[76] Inventors: Brendan O'Dowd, 27 Foster Crescent, Knoxfield, Victoria; Christopher Pitcher, 13 Orange Grove, Bayswater, Victoria, both of Australia

[21] Appl. No.: 246,427

[22] Filed: Mar. 23, 1981

Related U.S. Application Data

[63] Continuation-in-part of Ser. No. 190,510, Sep. 25, 1980, abandoned.

[51] Int. Cl.³ .................... G06F 7/02; G06F 15/16
[52] U.S. Cl. .................................................. 364/200
[58] Field of Search .................. 364/200 MS File

[56] References Cited

U.S. PATENT DOCUMENTS

| | | | |
|---|---|---|---|
| 3,768,074 | 10/1973 | Sharp et al. | 364/200 |
| 4,214,305 | 7/1980 | Tokita et al. | 364/200 |
| 4,223,380 | 9/1980 | Antonaccio et al. | 364/200 |

OTHER PUBLICATIONS

"Analysis of Multiple-Microprocessor System Architectures", *Computer Design*, Alan J. Weissberger, Jun. 1977.
"Multi-processors: An Overview and Working Example", *Evolution of Computer Building Blocks*, Samuel H. Fuller et al., pp. 463-484.

*Primary Examiner*—Thomas M. Heckler
*Attorney, Agent, or Firm*—Schwartz, Jeffery, Schwaab, Mack, Blumenthal & Koch

[57] ABSTRACT

A concurrent processing system utilizes a generalized linearly expandable data transfer bus architecture to tightly couple data processors, memory and I/O devices. The system is suitable for multiple instruction multiple data processing, and operates by transmitting and receiving complete transaction codes fully identifying the target device by specifying a process code. Data processing memories and I/O devices may be dynamically assigned to a process by specifying the process code thus providing great flexibility in utilization of system resources. Processors, memories and I/O devices are connected together by means of interfaces which are connected to a bidirectional bus. The complete data transaction preferably occurs during one clock period, although four additional clock periods are used to complete a bus transaction, namely, arbitration, match recognition, data validation and acknowledgement of receipt.

All the interfaces examine each transaction on the bus 5 preferably simultaneously, and allow the transaction to pass to a device and or I/O, if control registers in the interfaces correspond to those of transaction.

The five bus transactions are overlapped in time so that a data transfer may occur with each clock cycle resulting in a data pipeline system of very high data transfer rates.

40 Claims, 27 Drawing Figures

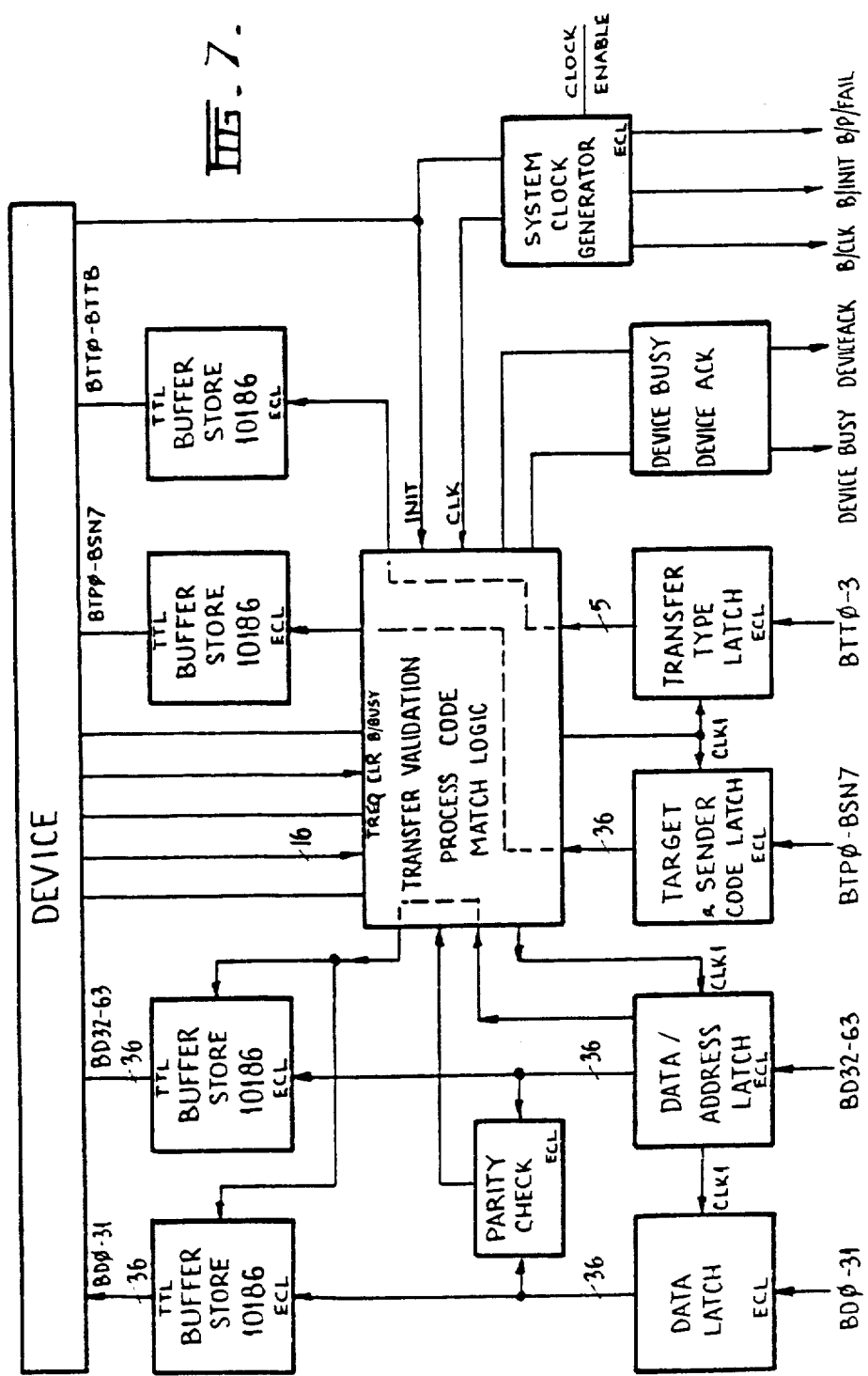

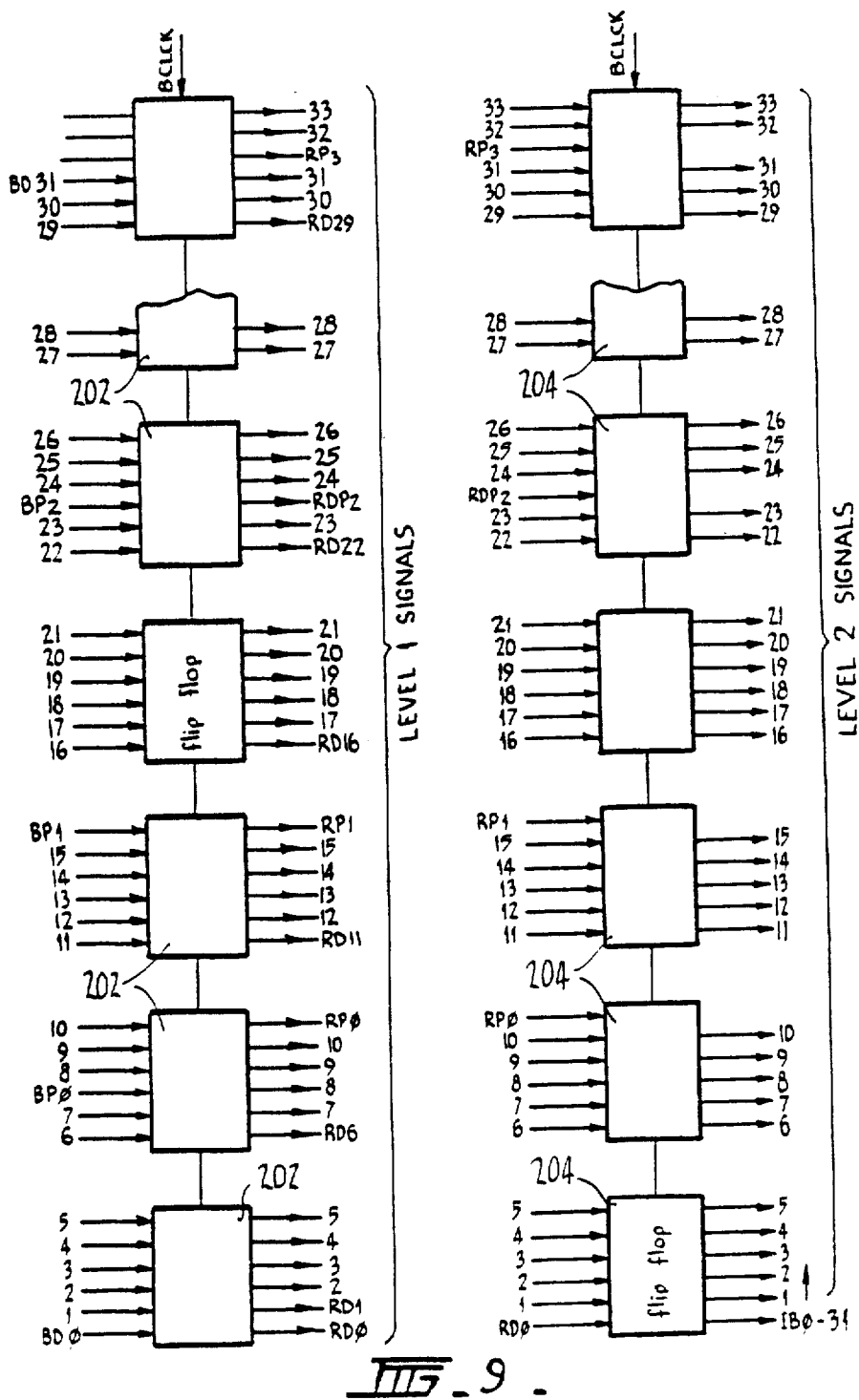
FIG_9

TRANSFER TYPE BIT ENCODING

| | BTT3 | BTT2 | BTT1 | BTT0 | ISSUED BY PROCESSOR | MEMORY |
|---|---|---|---|---|---|---|
| READ REQUEST | 0 | 0 | 0 | 1 | ✓ | Receives |
| WRITE REQUEST | 0 | 0 | 1 | 0 | ✓ | Receives |
| READ THEN WRITE | 0 | 0 | 1 | 1 | ✓ | Receives |
| MAILBOX | 0 | 1 | 0 | 0 | ✓ | X |
| READ RESPONSE | 0 | 1 | 0 | 1 | X | Issues |
| REDIRECT | 1 | * | * | * | ✓ | X |

FIG. 16.

| | 30ns sec. | 30ns Sec. | 30ns Sec. | 30ns Sec. | 30ns Sec. | 30ns Sec. | 30ns Sec. | 30ns Sec. |
|---|---|---|---|---|---|---|---|---|
| RECEIVER SECTION | | | | | | | | |
| 1ST TRANSACTION | | 1ST LEVEL LATCH | 2ND LEVEL & MATCH DETECTION | CHECK DATA | GENERATE BUSY & ACK | | | |
| 2ND TRANSACTION | | | 1ST LEVEL LATCH | 2ND LEVEL & MATCH DETECTION | CHECK DATA | GENERATE BUSY & ACK | | |
| 3RD TRANSACTION | | | | 1ST LEVEL LATCH | 2ND LEVEL & MATCH DETECTION | CHECK DATA | GENERATE BUSY & ACK | |
| TRANSMITTER SECTION | | | | | | | | |
| 1ST TRANSACTION | ARBITRATION | TRANSMIT | | | DETECT BUSY/ACK | | | |
| 2ND TRANSACTION | | ARBITRATION | TRANSMIT | | | DETECT BUSY/ACK | | |
| 3RD TRANSACTION | | | ARBITRATION | TRANSMIT | | | DETECT BUSY/ACK | |

FIG. 22.

TIGHTLY COUPLED MULTIPLE INSTRUCTION MULTIPLE DATA COMPUTER SYSTEM

CROSS REFERENCE TO RELATED APPLICATIONS

This application is a continuation-in-part of Ser. No. 190,510, filed Sept. 25, 1980, now abandoned.

BACKGROUND OF THE INVENTION

1. Field of the Invention

This invention relates to an improved computing system and to parts thereof and relates particularly, but not exclusively, to such systems usable in multiple instruction multiple data (MIMD) applications.

2. Description of Prior Art

In this art there has been an increasing demand for more powerful computers. Such demand has been met by the development of single processors of steadily greater complexity using the fastest possible circuits. This approach has been successful to some extent only. Typical examples of computers using the current state of the art fast circuits are the machines known as C.D.C. STAR and CRAY-1. The approach taken to develop the fastest possible circuits has several disadvantages.

Firstly, there is a need to perform operations at a rate which exceeds the fastest possible speed at which the units can process arithmetic. This has meant that in order to provide for the necessary speed, several such units must be employed simultaneously. This, in turn, requires that there be a control unit capable of initiating the various functions in overlapped or simultaneous time sequences. This is extremely difficult, and the devices devised for this purpose have been extremely expensive.

Secondly, the need to employ the fastest available circuit technology has meant that the full economic benefits of large scale integration have not been exploited in the computers. Further, the complexity of the design of very large uni-processors means that they cannot readily be divided into function units of a size matching the available size of LSI chips without requiring an uneconomically large number of different functional unit types.

Thirdly, because the uni-processor is capable of executing only one program per se at a time, the use of a large uni-processor to execute a large number of tasks on a time sharing basis including interactive tasks requires a complex control unit.

Fourthly, the large uni-processor is designed and constructed as a specific unit. It is not possible to gradually increase the processor power to match a gradually increasing work load. Hence, very large uni-processors may spend the early part of their life seriously underused and the later part seriously overloaded.

In the art of implementing control units to control a series of uni-processors for dividing overlapping processing of information, there have been many serious problems. These have been identified as problems relating to the architectural nature of the system as a whole. The following ideas have been identified as specific problems:

1. Choice of interconnecting structure for the system bus.
2. Interrupt assignment strategy.
3. Memory mapping techniques.
4. Interprocessor communications.
5. Task synchronization.

These difficulties have been documented in an article entitled "Analysis of Multiple—Microprocessor System Architecture", by A. J. Weissberger, pp. 151-162, Computer Design, June, 1977.

In addition, some of the problems associated with providing the required power of computers are attributable to the fact that additional processors and/or memory units cannot be added, at will, to the system to increase the power to the required level.

SUMMARY OF THE INVENTION

Accordingly, it is an object of the present invention to provide a solution to one or more of the above problems. In one embodiment, a computer architecture structure is described which enables any desired number of processors and/or memory units to be added to a system bus, at will, up to a maximum number which can be fitted over a specified length of the system bus. The specified size of the system is related to the clock periods used in the system and to the degradation of the signals as they pass along the bus. The system size may be further increased by transferring transactions to a further bus in a controlled manner so that the system is not limited as to the eventual power thereof.

The invention is applicable not only to a computer system as a whole, but also to an interface means which enables existing processor and/or memory unit devices to be interconnected.

The invention incorporates the use of an interface means connecting each device (processor, memory unit, I/O controller) to the system bus. All device interfaces examine all transactions on the bus through the intermediary of the interface.

The transaction code includes a sender code, a target code a process code, transaction transfer type code, device address codes, and a data code. The process code, device address code, and transaction transfer type code can be considered as individual addresses which in each transaction collectively represent a total or global address for the entire transaction.

A complete transaction (including all necessary process, address and type codes) is placed on the bus, preferably during one clock period. Each interface has registers therein which are set to recognize the particular process codes, transfer type codes and device address codes. Thus, only those interfaces which have the appropriate matching coded registers enable the transaction containing these codes to pass to the particular device connected to the matching interface.

With such an arrangement, it is possible to bind together a particular processor and one or more memory units and/or I/O controllers and the like on the bus by the use of process codes. It is then also possible to bind together another processor and one or more memory units on the same bus by the use of different process codes. Accordingly, transactions can be placed on the bus during controlled, but successive clock periods without any undesired interaction of transaction for one set of bound-together devices with another set of bound-together devices. Thus, while one particular processor and/or memory unit is processing a transaction, additional processors and/or memory units in another process on the same bus can be processing another transaction. Additionally, the address registers of each interface can be dynamically alterable so that there can be a controlled interaction between processes by altering the registers storing the process codes.

Therefore, in accordance with the broad aspect of the present invention, there is provided a multiple instruction multiple data computing system for performing at least two separate processes comprising:

(a) at least two processor devices
(b) at least two memory devices
(c) each said device having its own interface for interconnecting the respective device to a bus
(d) a bus so interconnected with said device
(e) a system clock; characterized in that, each transaction on the bus comprises process code addresses as well as a device code address, a transaction type control signal and a data signal all occurring simultaneously during a clock period, and in that all interfaces are arranged to simultaneously examine each bus transaction during the clock period, and in that the system can bind all devices for a particular process by a common process code so that there will be no interaction with devices bound to different process in the system.

In accordance with a further aspect of the present invention, there is provided a system as described above wherein the registers in the respective interfaces are dynamically changeable by controlling means when required so that there can be interaction between the devices associated with different processes in the system.

According to a further aspect of the present invention, there is provided an interface for use in a computer as set out above wherein said interface has a series of different registers which are arranged to, in use, inspect a bus transaction, characterized in that said registers are respectively for recognizing during receiving a transaction, process code addresses, device code addresses and transaction type control signals in transaction match detection circuitry connectable to said registers, whereby if there is a match between the register addresses and the transaction addresses, then data in the transaction can pass through said interface to the connected device, and during transmitting a transaction provide said processes code addresses and said device code addresses to said transaction.

BRIEF DESCRIPTION OF THE DRAWINGS

In order that the present invention can be more clearly ascertained, a preferred embodiment will now be described with reference to the accompanying drawings wherein:

FIG. 7 is a concept block circuit diagram of the interface showing the receiving circuits;

FIG. 9 is a detailed block circuit diagram of latching circuitry of the interface in the receiving mode;

FIG. 16 is a transfer type bit encoding chart;

FIG. 22 is a chart showing overlapped sequences of events during receiving and transmission of transactions.

DESCRIPTION OF PREFERRED EMBODIMENT

Figure 1:
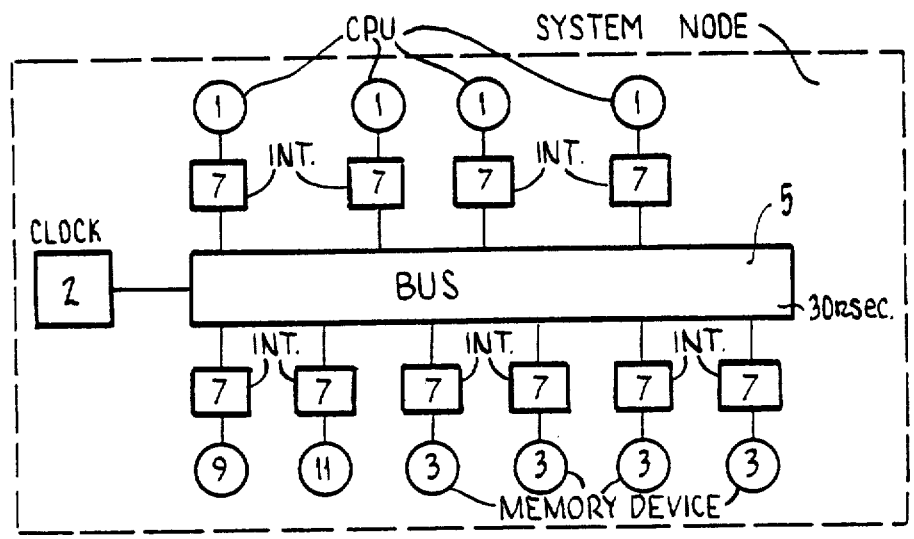
FIG. 1 is a block schematic diagram of a typical system.

Referring firstly to FIG. 1, there is shown a layout of one typical computer node or system. The node comprises a number of processors or central processing units (CPU) designated by numeral 1. The node also includes a number of memory devices designated by numeral 3. The processing unit 1 and the memory unit 3 are interconnected to a bus 5 by means of interfaces 7. The bus 5 has a system clock 2 connected thereto. It also has an input device 9 such as a keyboard connected thereto by means of an interface 7 through an intermediatory controller (not shown) and an output device 11 such as a printer also connected thereto by means of another interface 7 through another on the same intermediatory controller (also not shown). The bus 5 is a standard bus known in computer art. The required number of lines for the bus will be described later.

Each of the interfaces 7 are identical in function but differ physically only in that the devices connected thereto may require different inputs and/or outputs. The system clock 2 is arbitrarily chosen to run at 30 nsec. The period of the clock pulses can be any suitable time period.

Figure 1A:
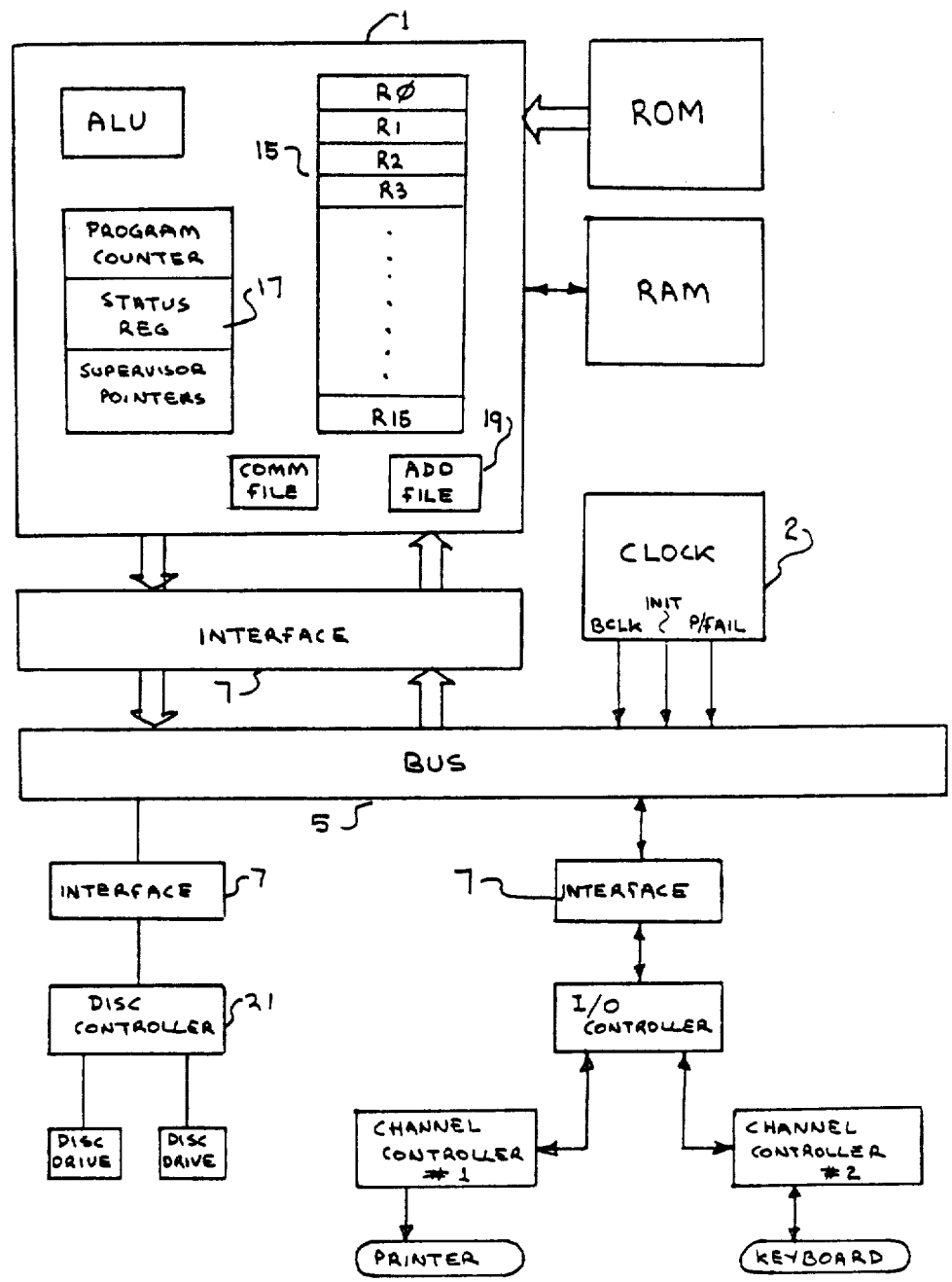
FIG. 1A is a block schematic diagram showing an expanded view of a processor connected to the system of FIG. 1.

FIG. 1A illustrates a simple node system similar to that of FIG. 1 and further shows a typically computer architecture which may be utilized for the processors 1. A processor 1 is shown to comprise a series of registers grouped into file sets on the basis of function. A central register file 15 consists of sixteen general purpose registers which may be used as data operands, index registers or stack pointers. One register (R15) is used by instructions which imply a stack pointer and so fulfills a "User Stack Pointer" function. A control and status file 17 includes a program counter, status register and supervisor pointers. These registers determine the current execution status of the processor. An address file 19 contains extensions to the processor generated addresses to specify system space for memory operations. A communication file may also be utilized to act as a buffer area for interprocessor communication common to both send and receive operations, e.g. mailbox type messages as discussed below.

The processor generates an address by concentrating a 32 bit pointer from either the general register file 15 or the control and status file 17 with an extension address from the address file 19. The resulting quantity provides a single level system wide address. Each address from the address file 19 defines an address space which may or may not be unique to the given processor. Generally, the system provides that each system address defines a unique location on the system, which may or may not have a hardware location associated with it.

When the location defined by the system address is not a physical memory location, it is considered a virtual address. Memory may be associated with virtual addresses in pages, with page size being either 4K or 16K words (depending upon whether 16K RAM's or 64K RAM's are utilized). Memory addresses are processor length word addresses. A disk system utilizing a disk controller 21 and a disk drive unit is utilized for reading and writing blocks of data to or from memory. The disk controller drive may comprise, for example, a 2901 Bit Slice device (Advanced Micro Devices) and CDC 9600 series disk drive respectively. Disk control is by a set of control registers, located in a specific address space and accessed in the same way as memory. A processor, thus, may establish a virtual environment by associating virtual addresses with space on a disk and arranging for copies of this disk space to be read to and from physical memory.

The maximum number of devices that can be connected to a maximum length bus operating as 30 nsec. is 64. The physical construction is such that the backplane bus is made in two halves each of 32 slots. A device includes both active devices such as CPU's and memory devices 3 and passive devices such as Node Bus Terminations.

The system can be configured as either a half or a full system by using only one backplane of the section of the bus 5 or two linked together. In each case a terminator must be installed in the bus end positions to maintain a controlled impedance backplane.

It should be noted that this reduces the maximum number of active devices per bus to either 30 or 62.

It is very important that the impedance of the backplane be controlled and its characteristics uniformly distributed along the backplane. This is because ECL logic bus drivers and receivers are used, and such signals require proper termination by the backplane. This is a well known art and is referenced to in TAB Books/No. 709, Modern Guide to Digital Logic Processors, Memories and Interfaces pp. 120-188, United Technical Publications Inc.

Bus bandwidth is provided by keeping the data transfer times to a minimum. The system performance may have a bus time of 30 nanoseconds which includes time for a transaction to be transmitted and received, i.e. both the transmission and reception occurring within the 30 nsec. clock period.

The characteristics impedance of the bus is significant and this is determined by:

(1) the physical size and shape of the signal path, and
(2) the distributed loading per unit length.

Any device connected to the bus 5 must drive into a load of half of the line impedance. This is because the driver could be in any position on the bus line 5 which means it effectively drives two terminated lines in parallel.

The interfaces 7 which directly connect with the system bus 5 use ECL technology for the line drivers and receivers and will be detailed later as to how they operate when attached to particular devices.

In the embodiments herein all the interfaces 7 of the respective devices connected to the bus 5 examine each transaction on the bus irrespective of whether the transaction is to be fed to that respective device or not. The interfaces 7 permit the transactions to pass only if the transaction is intended for the respective devices connected with the respective interface 7 as determined by the codes recognized in the interface 7. The means which enables the respective interfaces to pass the transactions operates by looking for the same register codes as appearing in the transaction. The interfaces 7 each have registers which can be set to required codes and allow the transactions to pass if the codes correspond. As mentioned previously, the registers in the interfaces 7 are dynamically changeable. A discussion will follow later concerning the changeability of the registers in the interfaces 7.

By assigning a Process code to specific ones of the interfaces 7, one is able to assign a specific central processing unit 1 and one or more memories 3 to a specific task. Thus, for example, one processing unit 1 may be assigned to two memory units 3 for a particular task. Other processing units 1 in the system can be assigned to other memory devices 3 for other tasks. In this way there can be binding of the devices to particular processes within the system in a controlled manner. As the registers in the interfaces 7 are dynamically changeable, it is possible to alter the appropriate registers so that there can be interaction of data and codes between devices bound to different tasks. Hence, the system has the capability of multiple instruction, multiple data operation, i.e., MIMD operation.

It should be appreciated therefore, that a processing unit 1 and memories 3 therefor can be performing one particular task coincidentally with other processing units and memory units processing other tasks. Thus, there can be an overlapping of processing of tasks in the system herein.

Figure 2:
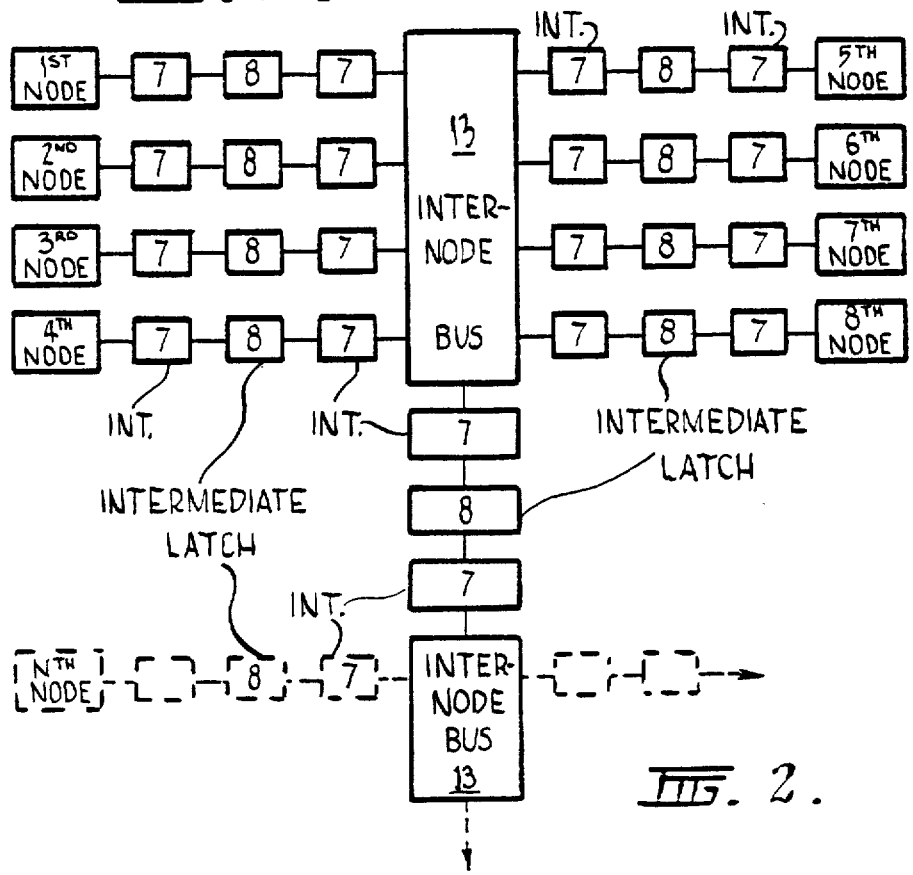
FIG. 2 is a block circuit diagram of a typical system which has increased power over that of the system shown in FIG. 1.

With the system as shown in FIG. 1, its power can be built up by adding the required number of processing units 1 and/or memory devices 3 to the bus 5. Should the power of the system require greater numbers of processing units 1 and memories 3 than can be physically attached to the bus 5 because of space requirements, then the bus 5 can be connected to an internode bus 13 as shown in FIG. 2. Two interfaces 7, each functionally of the same type as the previous interfaces 7 are connected between the bus 5 and the internode bus 13 by an intermediate latch 8 which operates in two directions of transaction movement to cover both transmission and reception. The latches 8 are means for storing the transaction as it comes through the interface prior to placing same in the transmitting registers of the other interface, and for holding that transaction until such time as the other interface obtains access to the next internode bus. Further computer nodes can be suitably interconnected to the internode bus 13 each by respective further interfaces 7 and latches 8. If even greater computer power is required, then additional internode buses 13 can be connected to the first mentioned bus 13 as has been shown in FIG. 2. In this way, the power of the computer can be built up to any desired power. The internode buses 13 are operated at clock speeds which allow transfer of transaction without undesired signal degradation. Typically, a clock period of 30 to 120 nanoseconds is used for the internode buses 13. Each of the buses 5 in the nodes connected to the internode bus are then operated at the 30 nanosecond clock cycle or at other suitable clock cycles.

Before describing the operation of one particular preferred computer system in accordance with the general structure of FIG. 1, it should first be appreciated that each transaction on the bus constitutes a parallel stream of bit patterns across the width of the bus 5. In the described implementation, 128 lines are used in the bus. The following transactions are utilized:

(1) Read request—sent by a processor or peripheral channel to initiate a memory read.
(2) Read response—sent by a memory unit to a processor or a peripheral channel in response to a read request.
(3) Write request—sent by a processor or peripheral channel to write a data word into memory.
(4) Mailbox message—sent by a processor to a processor or a peripheral controller (FIG. 1A) to convey synchronization or control a message. Receipt of a mailbox message may interrupt the receiving task.
(5) Read then write request—sent by a processor to a memory to initiate a read-modify-write request. The principle use of this type of transaction is to provide hardware for semaphor-type synchronization among a number of tasks all working off the same set of data.
(6) Redirect—issued by a transmitting interface when the device fails to receive a Device Busy or Device Acknowledge signal in reply to a previously transmitted transaction. This enables the transaction to be retransmitted to a device with an appropriate interface to take charge of all such transactions. This device may be programmed to simply store the transaction or to cancel the transaction.

Other types of transactions can be incorporated if desired.

From the above, it will be apparent that communications between devices connected to the system bus 5 occur when the communicating devices observe a protocol, e.g., a memory issuing a memory-response to a processor or a processor issuing a read-request to a memory.

Figures 3, 4:
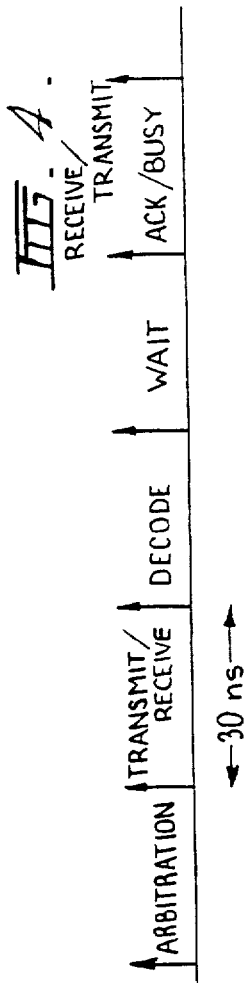
FIG. 3 is a diagram showing the types of fields in a transaction and the number of bits employed for transmitting each code.
FIG. 4 shows diagrammatically the timing of an arbitration request and a Device Acknowledge or Device Busy signal.

Each transaction is divided into a series of code fields as shown in FIG. 3. The fields comprise:

(1) Data
(2) Data/Address (device address)
(3) Clock
(4) Bus Init (Bus Initialize)
(5) Bus power fail
(6) Spares
(7) Transfer types
(8) Device Busy
(9) Device Ack
(10) Arbitration Code
(11) Target Code
(12) Sender Code The "Device Ack" and "Device Busy" can be implemented on control lines remote from or a part of the bus 5.

The various numbers of bits in each code field are shown in FIG. 3. For example, the Data field comprises 32 bits plus 4 parity bits making a total of 36 bits. The Data/Address field may be split between additional data (32) and address (26) bits with a 4-bit parity field. The clock field has 2 bits. The Bus Init and Bus Power Fail have 1 bit each, and the Spare field has 3 bits. The Transfer Types field has 4 bits plus one parity bit making a total of 5 bits. The Device Busy field has 1 bit. The Device Acknowledge field has 1 bit. The Bus Arbitration field has 6 bits. The Target code field is divided into a Process Number field and Node Number field and has a total of 16 bits plus 2 parity bits making 18 bits. The Sender Code field is divided into a Process Number field and Node Number field and has a total of 16 bits plus 2 parity bits. The power fail bit is used to indicate power fail conditions in respective the devices or interfaces within the system and is connected in known manner with these devices. In the following description, the term "process code" is taken to mean the target and/or sender codes. The node number is the number of the node in the system. The system is set up so that after gaining access to the bus a Device Ack or Device Busy signal is received three clock periods later. Five clock periods are involved from seeking arbitration to the receipt of these two signals. This sequence is shown diagrammatically in FIG. 4.

Figure 5:
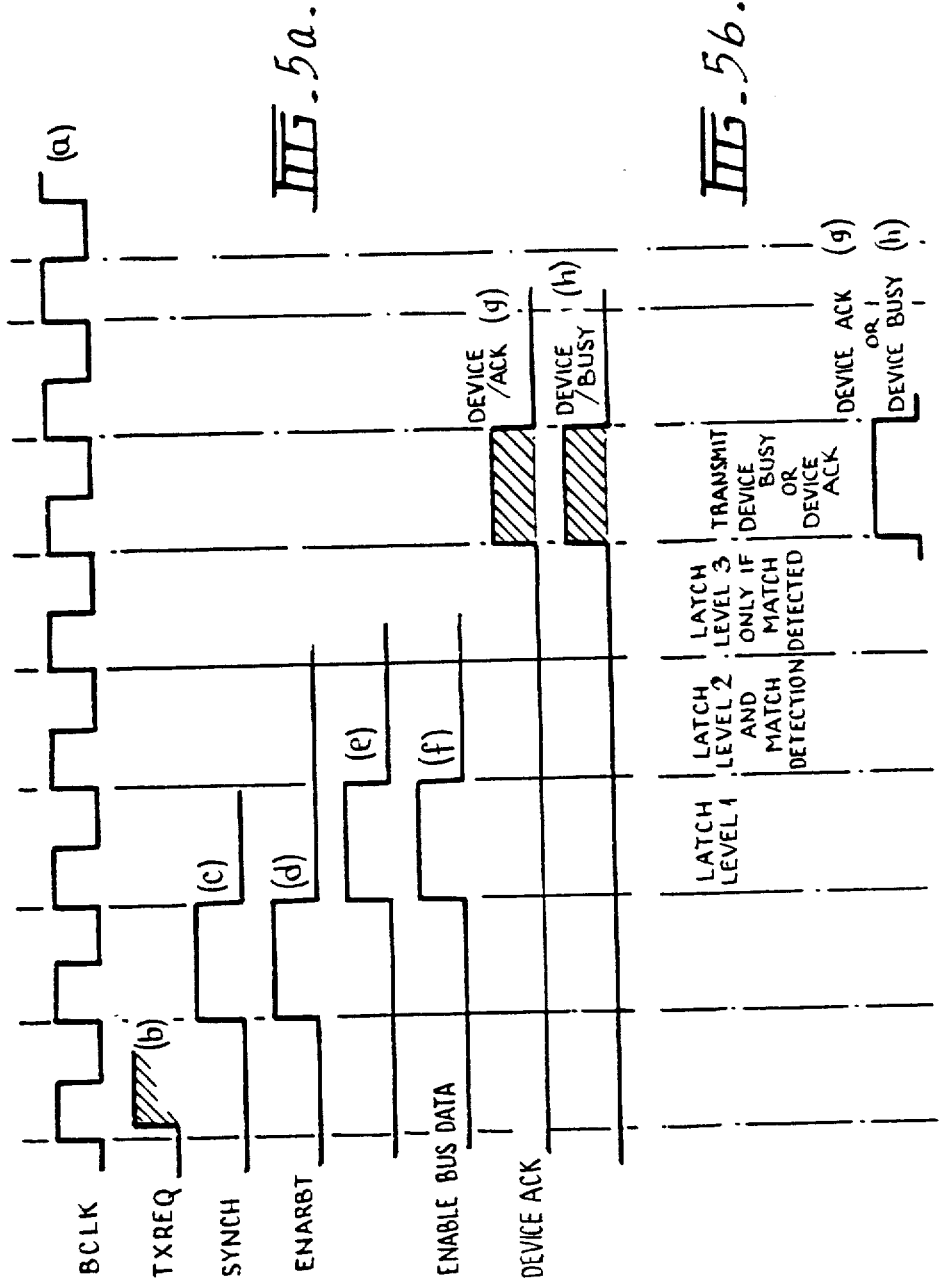
FIG. 5A is a timing diagram showing the time sequences and the signals generated for transmitting a transaction upon seeking arbitration to the bus and obtaining a Device Busy and/or Device Acknowledge signal.
FIG. 5B is a timing diagram showing the sequence of events in receiving a transaction.

A timing diagram showing the timing of transactions occurring on the bus 5 during transmission is shown in FIG. 5A. In FIG. 5A, the bus clock (BCLK) signals are shown in graph a. A transfer request (Tx Req) signal, such as a Read Request, shown in graph b, can be applied to the interface 7 at some time which may not correspond with the start of one of the clock periods. The transfer request is synchronized to the next clock period as shown by graph c illustrating a synchronization (sync) pulse. This enables the interface 7 to enable its arbitration mechanism at the commencement of the next clock period as shown by the ENARBT pulse in graph d. The ENARBT signal is used to obtain control of the bus during the next bus cycle, as shown in graph e. Simultaneously an enable bus data signal shown in graph f is generated. The device which receives the transaction during the next clock period checks for a match condition with the appropriate codes and provides (A) a Device Ack signal if the device accepts the transaction or (B) a Device Busy signal if the device is busy. This occurs three clock periods later than the enabled bus data signal of graph f.

In FIG. 5B, there is shown the clock periods used in receiving the transaction. Also shown are various latching processes which occur within the interfaces during the receiving mode until the Device Ack or Device Busy signals are provided. The timing periods are aligned with the signals of FIG. 5A. The data transaction along the bus and its latching into level 1 latches corresponds with the enable bus data signal as shown in graph f of FIG. 5A. During the next clock period, there is a level 2 latch condition within the receiving interface 7, and a simultaneous match detection (comparison) is made. If a match condition exists, then the transaction is passed to a level 3 latch during the next clock period, and subsequently, a Device Ack or Device Busy signal is generated by the interface as shown in graphs g or h of FIGS. 5A. Such signals are received (in the same clock period) as illustrated by the aligned graphs g and h of FIG. 5B.

Figure 6:
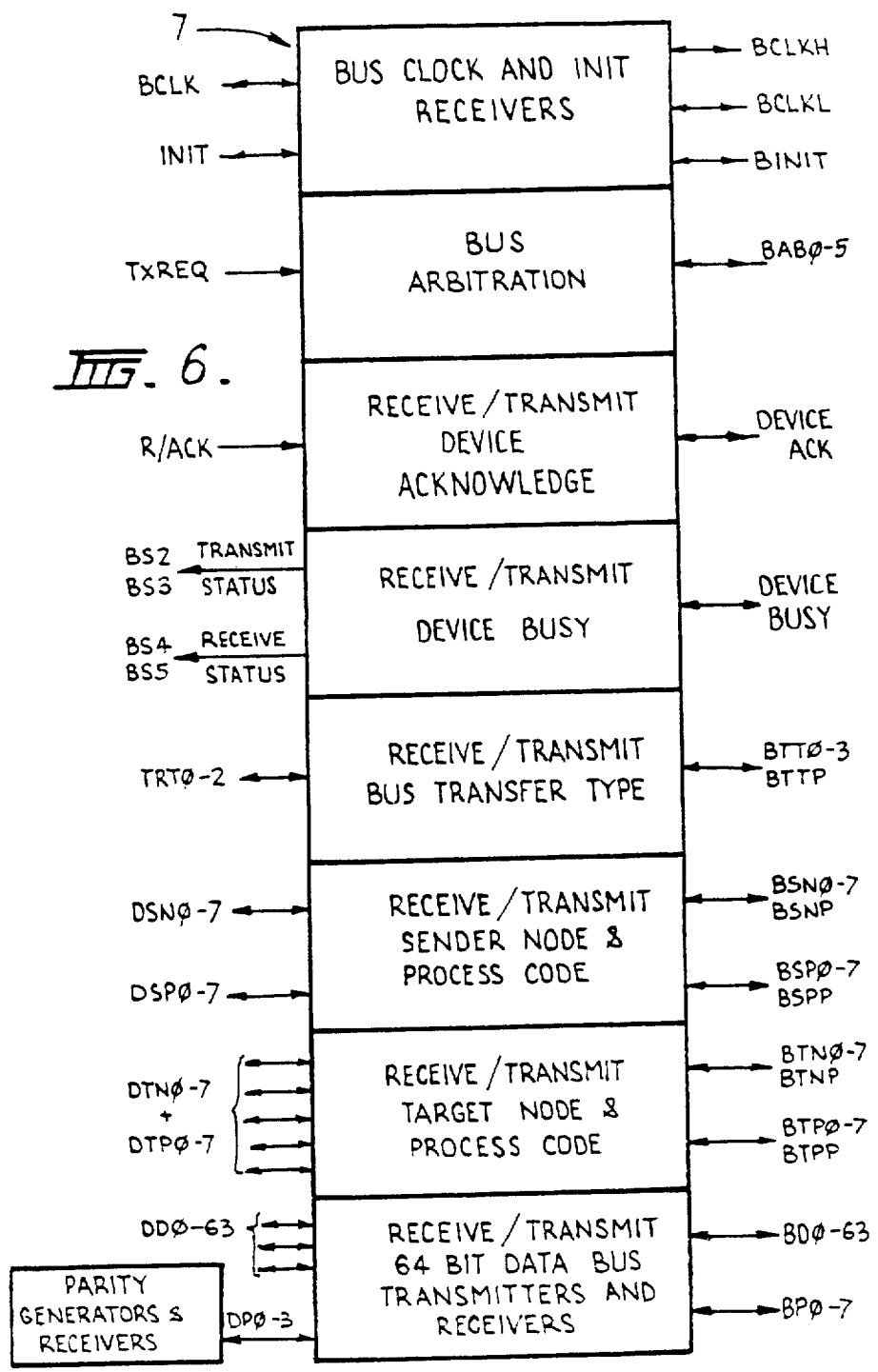
FIG. 6 is a concept block circuit diagram of an interface.

The functional components of interface 7 are shown in concept block schematic form in FIG. 6. It can be seen by inspecting FIG. 6 that there is a block provided for each bit section or field of the transaction as shown by the bits in FIG. 4. All the bus lines are prefixed by the letter B and all the device lines such as the central processing units 1 or the memory units 3 are prefixed by the letter D.

It should be appreciated that certain of the blocks have receiving and transmitting functions and others have only one function as shown. All interfaces on the bus have a unique register addresses determined by a set of DIP switches.

All interfaces respond to both their process code and register address. At switch-up time there is no process code stored in the interface. Thus, initially the interface can respond only to the register address but the registers of the interfaces can be loaded via their inherent addresses. Subsequent loading of the process code registers enables the transaction target codes to be compared against the contents of the address registers.

This process of comparing Process Code, Device Address Code and Transfer Types produces a "match condition". The match condition signifies the acceptance criterion of the interface, and if match occurs, the "data" is enabled to pass through the interface. A match condition occurs when the interface 7 is in the receive mode only. Accordingly, in the receive mode all interfaces examine each transaction on the bus 5, irrespective of whether that transaction is to be passed to the device connected to that interface 7 or not. All interfaces 7 look for a match condition, and only if match is found does the data pass through the interface to a level 3 latch for subsequent passing to the connected device 3.

FIG. 7 shows a concept block circuit lay-out of the components in the receive section of FIG. 6. FIG. 8 shows a concept block circuit lay-out of the transmit section of the components in FIG. 6. Referring to FIG. 7 it can be seen that in a receiving mode a device connected to the bus 5 has respective latch means for the Bus Data, the Data Address, the Target and Sender Code, the Transfer Type as well as "Bus Busy" and "Bus Acknowledge Signals". The latches which latch on to these respective signals transform the logic of the bus, in the current implementation E.C.L. logic, through various matching circuits parity check circuits and buffers at appropriate clock periods after initial latching so that it is presented to the device in the required logic to be used in that device. In this case the logic presented to the device is T.T.L. logic.

Similarly in FIG. 8 in the transmission mode the T.T.L. logic of the device is reconverted into E.C.L. logic before applying it back to the bus 5. In the transmission mode there are latches for the transfer of Data, transfer of the Data Address, transfer of Target and Sender Code, transfer of Transfer Types as well as the Bus Arbitration and "Bus Busy" and "Bus Ack" signals. The actual transfer of the data occurs at the appropriate clock period after seeking arbitration to the bus.

Figure 7A:
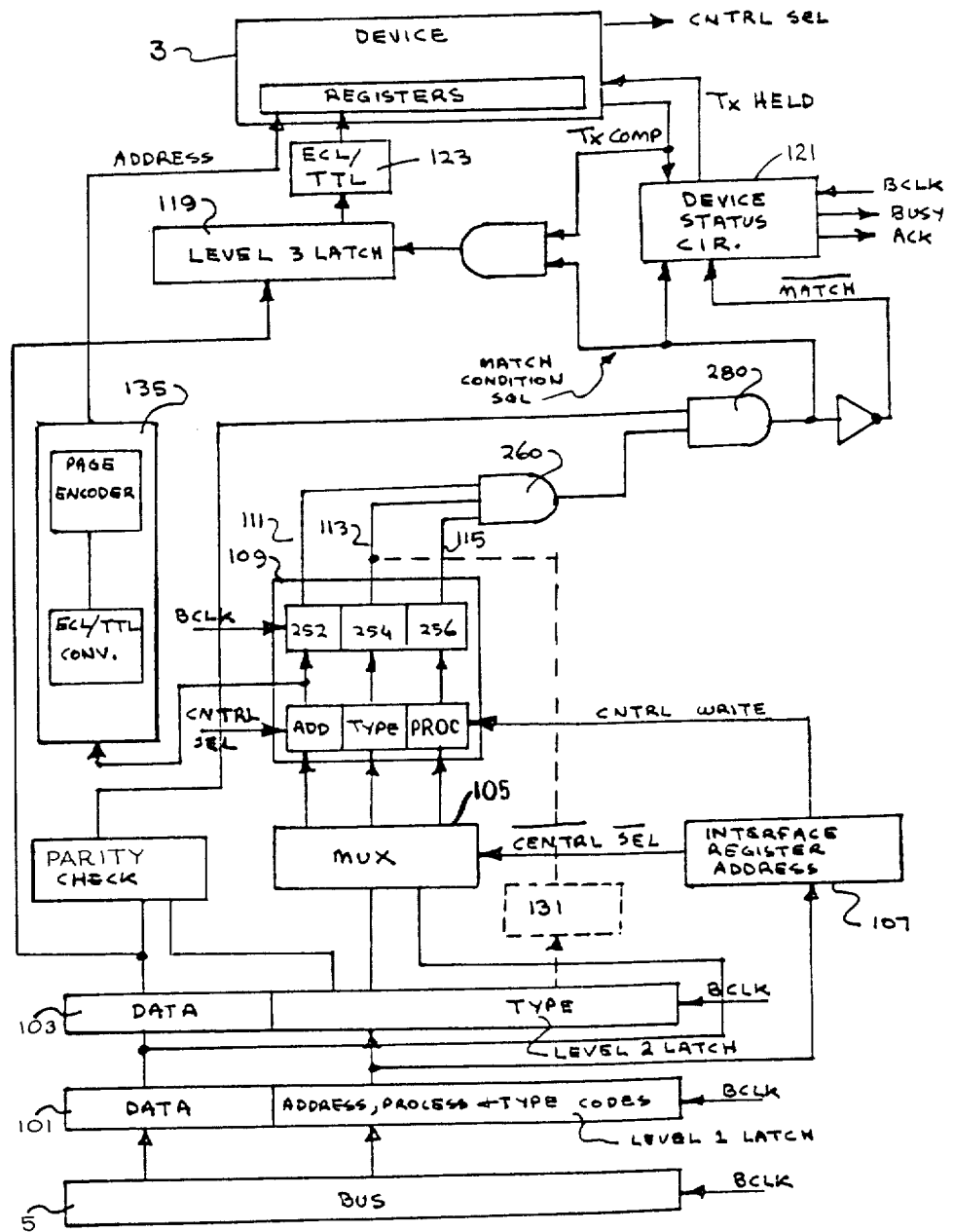
FIG. 7A is more a more detailed block circuit diagram of the interface shown in FIG. 7.
Figure 8:
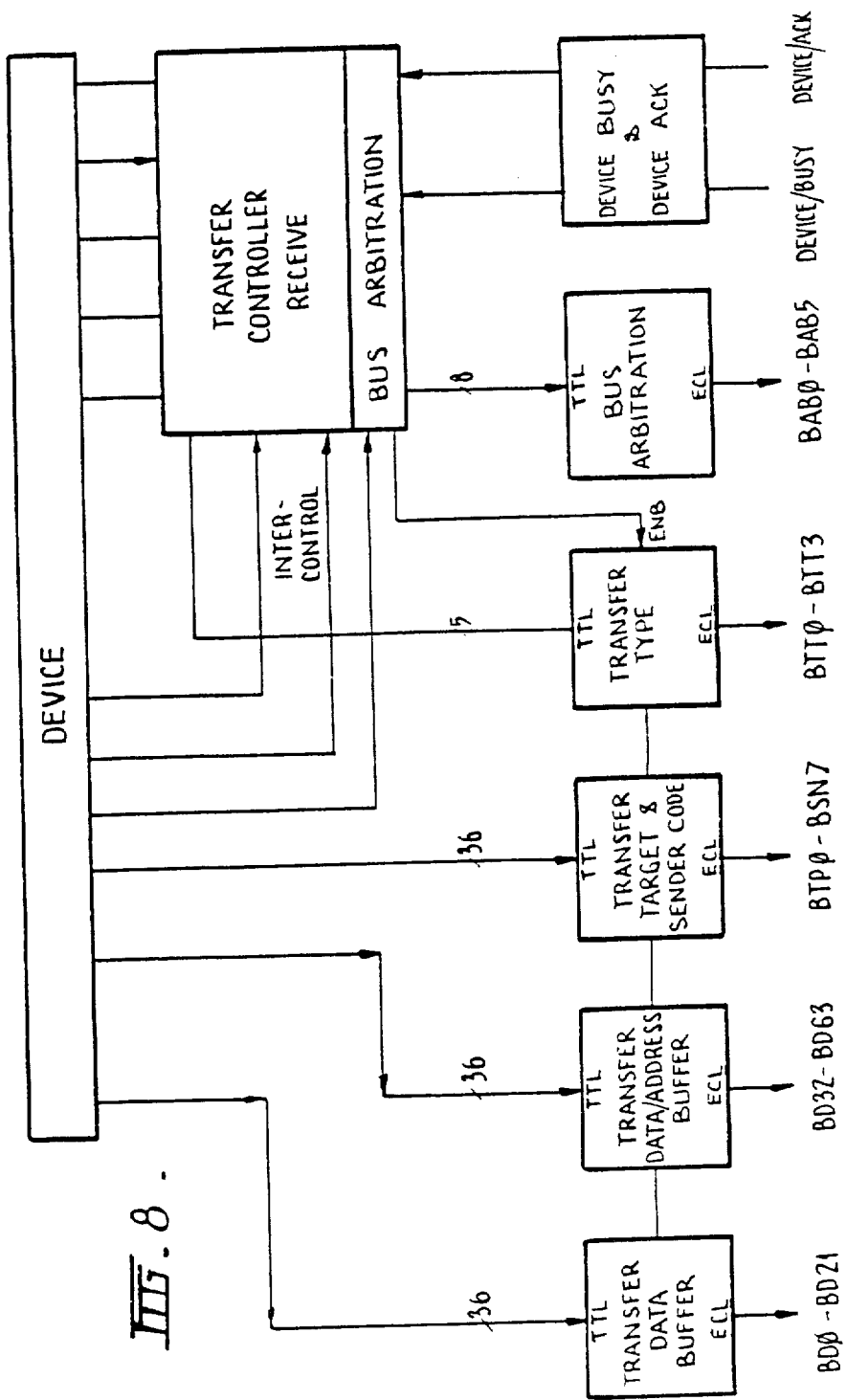
FIG. 8 is a concept block circuit diagram of the interface showing the transmitting circuits.

A more detailed block diagram of the receiving circuitry utilized in interface 7 is shown in FIG. 7A. The interfaces are seen to comprise a level 1 latch 101 connected to receive transmitted information along the bus 5. This information includes the relevant transmission codes which comprise the device address, data to be stored or which is to be operated upon by the device, transfer type codes, and process codes (target code or sender code information). The level 1 latch 101 is made up of a plurality of flip-flops as better illustrated in FIG. 9. Data is latched onto the level 1 latch 101 by means of the bus clock pulse BCLK. Upon receipt of a second bus clock pulse, BCLK, data from the level 1 latch is stored or latched into a level 2 latch 103. The level 2 latch 103 is also composed of a plurality of flip-flops as illustrated in FIG. 9.

Figure 11:
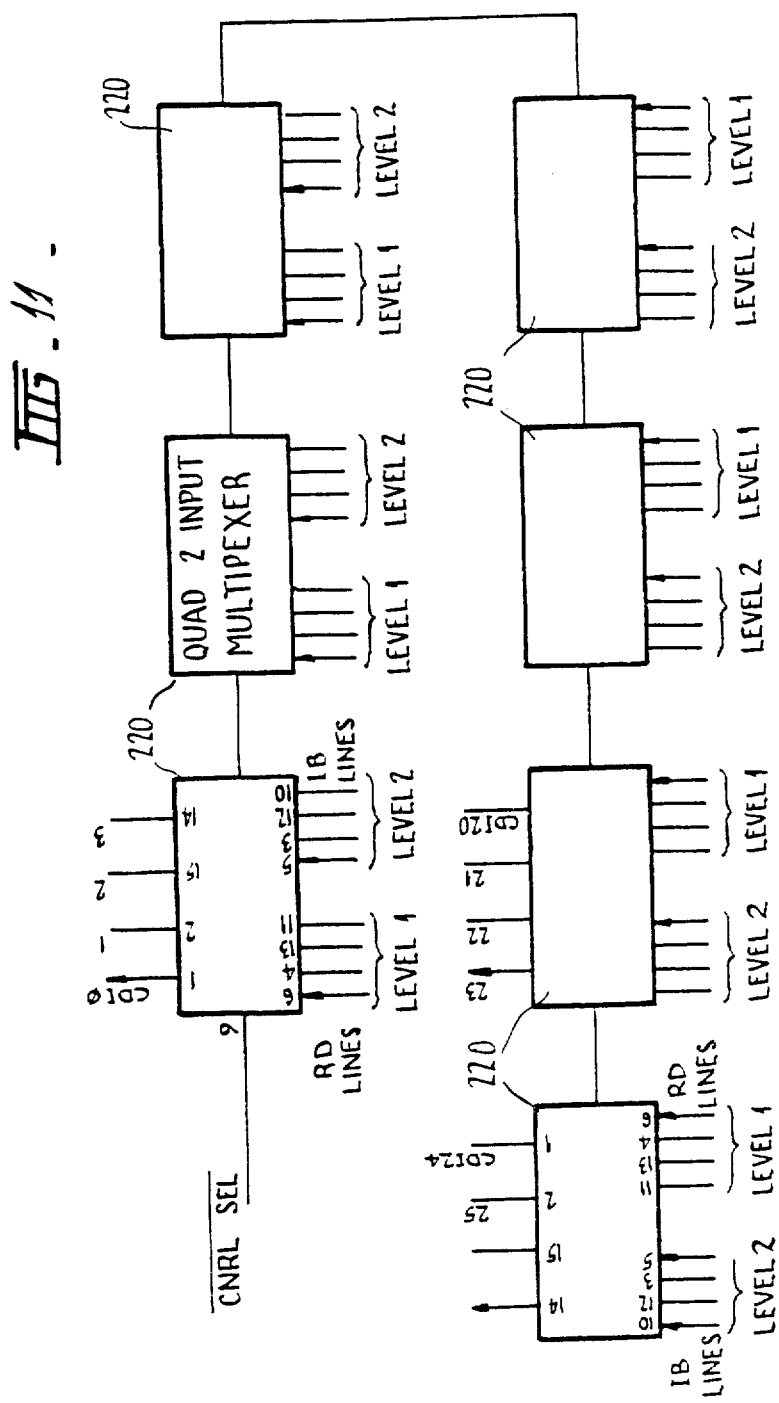
FIG. 11 illustrates multiplexers used in data selection for the interface registers.

Information stored in both latches 101 and 103 is connected to a multiplexer 105 as better illustrated in FIG. 11. The multiplexer 105 operates in response to a control signal to select either the level 1 or level 2 information stored respectively in latch 101 or 103. The control select signal is issued by a register address detection circuit 107 as described more fully in FIG. 17A. The selected level 1 or level 2 data which is passed through the multiplexer 105 is fed to a comparison means 109 which is composed of content addressable memories and hex inverters as more fully set forth in FIGS. 12 and 13. The content addressable memories separately compare the relevant information with the stored information residing in the content addressable memories. Thus, as seen in FIG. 7A three separate arrays of memories may be utilized for comparing the incoming device address with the stored device address, the incoming type code field with the stored type code field and the incoming process code information (target field) with the stored process code information. The stored type information is indicative of the particular device to which the interface 7 is connected. For example, the device may be a CPU device or a memory device, and the difference is significant in that certain types of information are not appropriate for receipt by one device or another. For example, mailbox type codes are sent from processor to processor, and receipt of a mailbox code from an interface associated with a memory device will not result in a type code match. (The various types of transfer codes are explained more fully below in reference to FIG. 16.) The device address information is utilized to compare the incoming address with the address of the device to which the interface is connected. If, for example, the device is a memory storage unit, the address field codes will not compare if the incoming address field designates a memory location outside the range or different from that accessible by the device connected to the receiving interface. The process code information is utilized to compare the incoming process code with the stored process code. Typically, the process code identifies a process being executed in a global sense, and is not restricted to specifying a piece of hardware which is dedicated to a particular CPU device.

The purpose of the register address detection circuitry 107 is to enable the gating of the level 1 data through the multiplexer to the comparison means 109 in the event that the default detection circuitry identifies the received process code and device address codes as addressing the appropriate control address registers. If the received codes do identify the appropriate control address registers, the process code information is to be dynamically altered by writing into the content addressable memories with the information from the level 1 latch. The ability to dynamically alter the process code information enables the interface, and consequently the device connected thereto, to be reallocated to a different process which may (or may not) involve a wholly different set of CPUs. The allocation of a CPU device with a memory or I/O device by means of a process code is achieved in this manner.

Assuming that the register address detection circuit 107 does not detect a control address condition, the device address, type and process codes stored in the latch 103 are passed through the multiplexer 105 to the comparator means 109. A proper match for the address, type and process code information within the comparison means 109 is required in order for the data to ultimately make its way to the device 3 to which the interface is connected. The individual match conditions are provided along output lines 111, 113 and 115 of the comparison means 109 to an AND gate 260. The match condition is further dependent on a parity check signal issued from parity checking circuit 117. A parity check made on the incoming data is fed to an AND gate 280 which has another input provided by the output of AND gate 260. The output of AND gate 280 represents the match condition signal, and this signal is utilized to enable the storage of the data and address information from the level 2 latch 103 to a level 3 latch 110.

The match condition signal from the output of AND gate 280 is also fed to the device status circuitry 121 which transmits either the Device Busy or Device Acknowledge signal back onto the bus in the third time slot after receipt of the incoming data as shown in FIG. 4. The device status circuitry 121 is responsive to signals from the device 3, and particularly, a transfer complete signal indicating that data from a previous transaction has been completed and thus the device is free to read, write or otherwise process more information. The device status circuitry 121 provides a transfer held signal to the device 3 indicating that the data in the level 3 latch 119 is ready for transfer into the device itself. Typically, as shown in FIG. 7A, the transfer of the level 3 data to the device 23 is by way of a ECL/TTL converter 123 since, in the preferred embodiment described below, high speed ECL logic is utilized. Typically, the device 3 has an internal register for storage of the data and address information from the level 3 latch 119.

An alternate comparison means is indicated in FIG. 7A for the type code field. The type code information may be passed to a type code detector 131 which decodes the type information primarily to ascertain whether the transaction is intended for a CPU or memory device. The type code detector is better illustrated and described in relation to FIG. 17 below. The output of the type code detector 131 is fed to line 113 to provide the required type match signal as an input to AND gate 260. In the utilization of this embodiment of the invention, the content addressable memories of the comparison means 109 would not store the type code fields.

Figure 14:
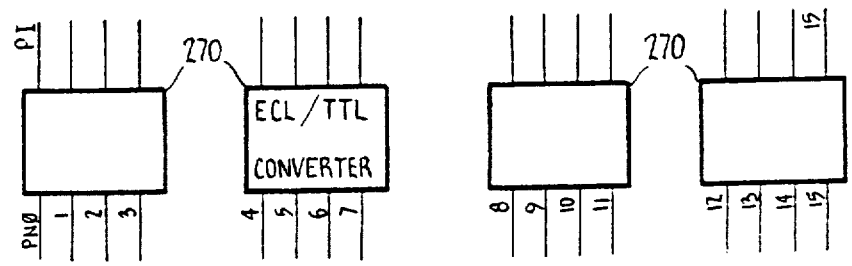
FIG. 14 illustrates ECL/TTL converters used in page location.
Figure 15:
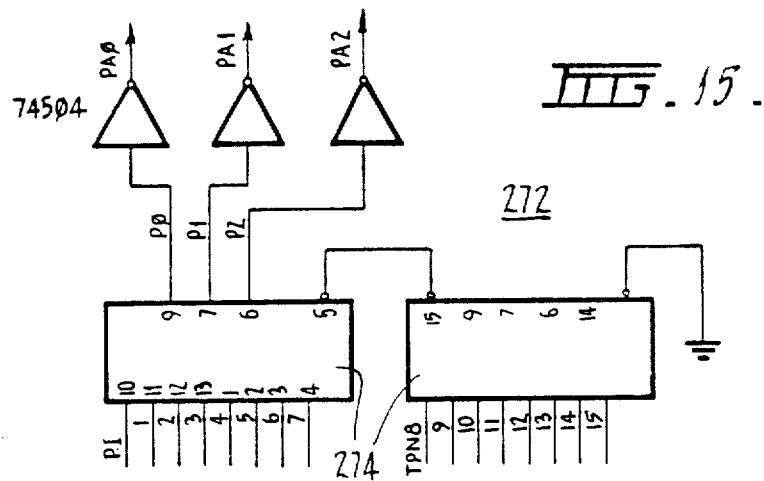
FIG. 15 illustrates a page address encoder circuit diagram.

Also illustrated in FIG. 7A is a page encoder circuit 135 comprising a ECL/TTL converter as shown in FIG. 14 and a page encoder as shown in FIG. 15. The page encoder information is utilized to strobe the data to the appropriate page address within the device 3.

Figure 8A:
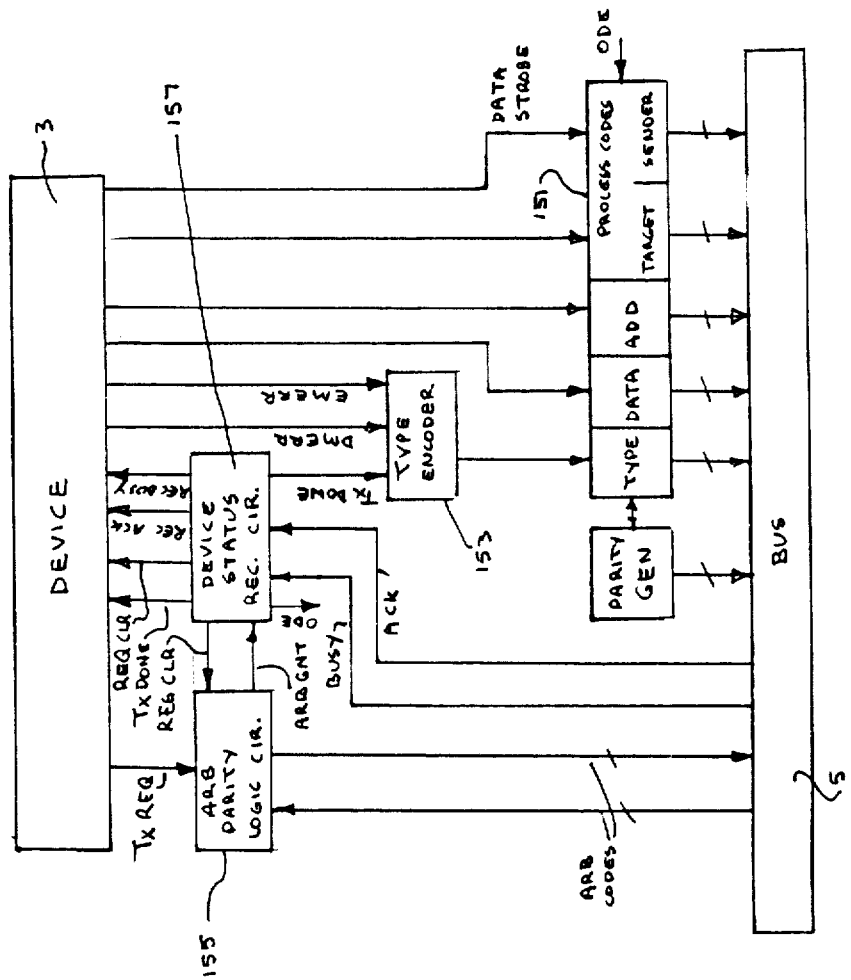
FIG. 8A is a more detailed block circuit diagram of the interface shown in FIG. 8.

FIG. 8A illustrates an overall block diagram of the transmitting circuitry shown in concept form in FIG. 8. It is understood that an interface 7 comprises the combined circuitry of FIG. 7A and 8A, and the separation of the circuitry into receiving and transmitting aspects is made for simplicity if description and understanding of the invention.

Figure 10:
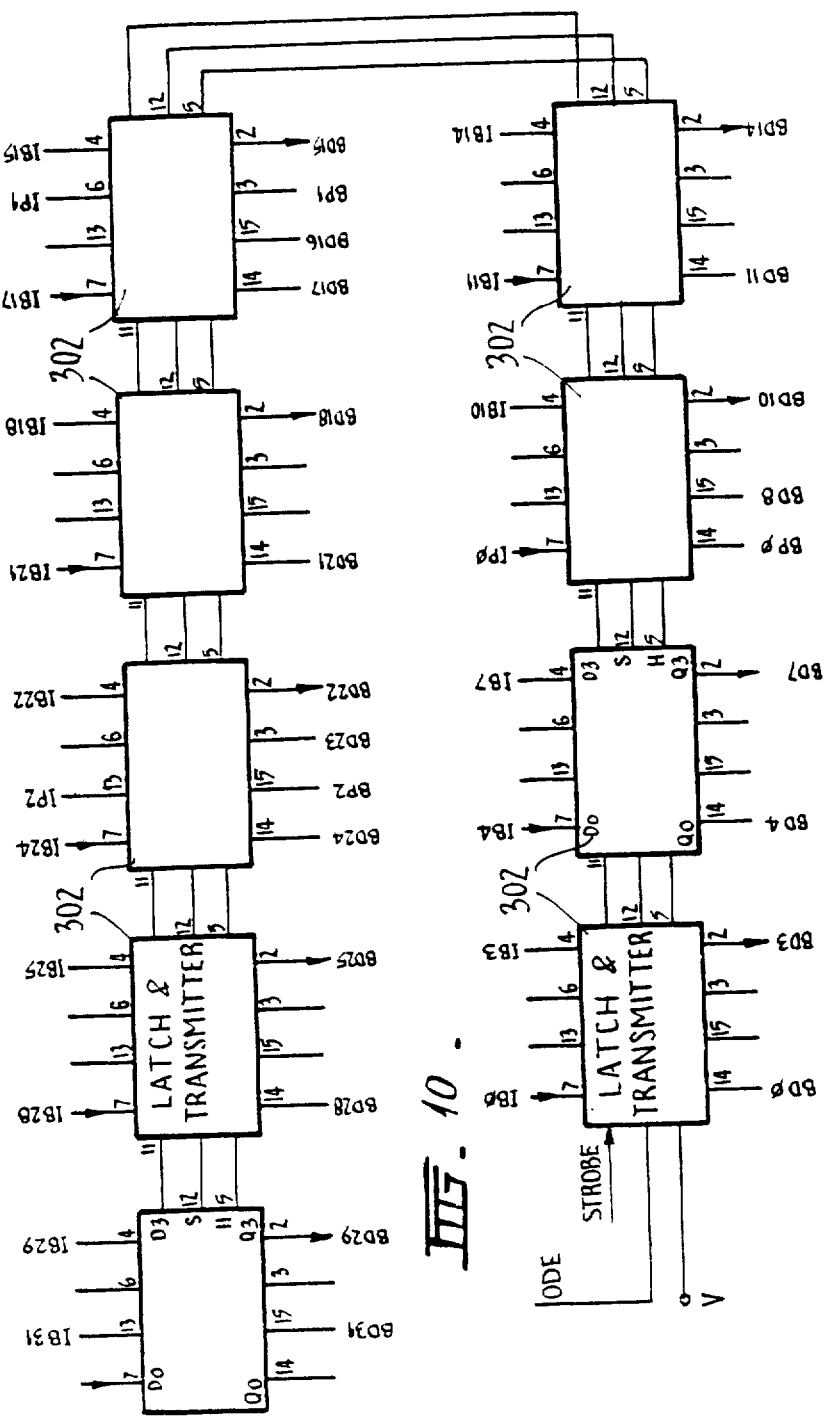
FIG. 10 is a detailed block circuit diagram of bus line drivers of the interface in a transmitting mode.
Figure 18:
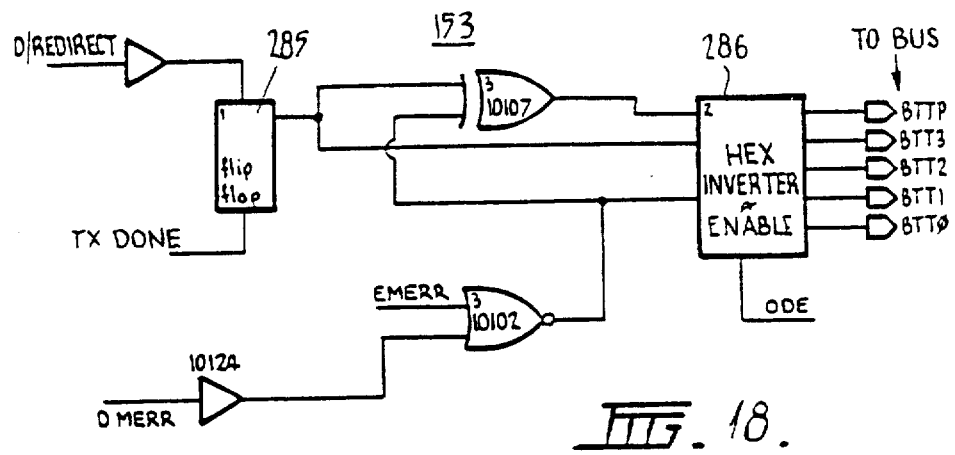
FIG. 18 is a block circuit diagram of a transfer type transmitter.

In reference to FIG. 8A, it may be seen that the data to be transmitted, the device address to which the data is to be transferred and the process codes are transmitted from the device 3 to bus 5 by means of a plurality of latch and transmitting circuits 151 as better illustrated in FIG. 10. The necessary type data information is also stored in the latch and transmitting circuit 151 but is fed by means of a type encoder circuit 153 utilized to primarily designate whether the target device is a CPU or memory device. However, special purpose I/O controllers or the like may also be designated by assigning a unique type code field. The details of the type encoder circuit are shown in FIG. 18.

Figure 19:
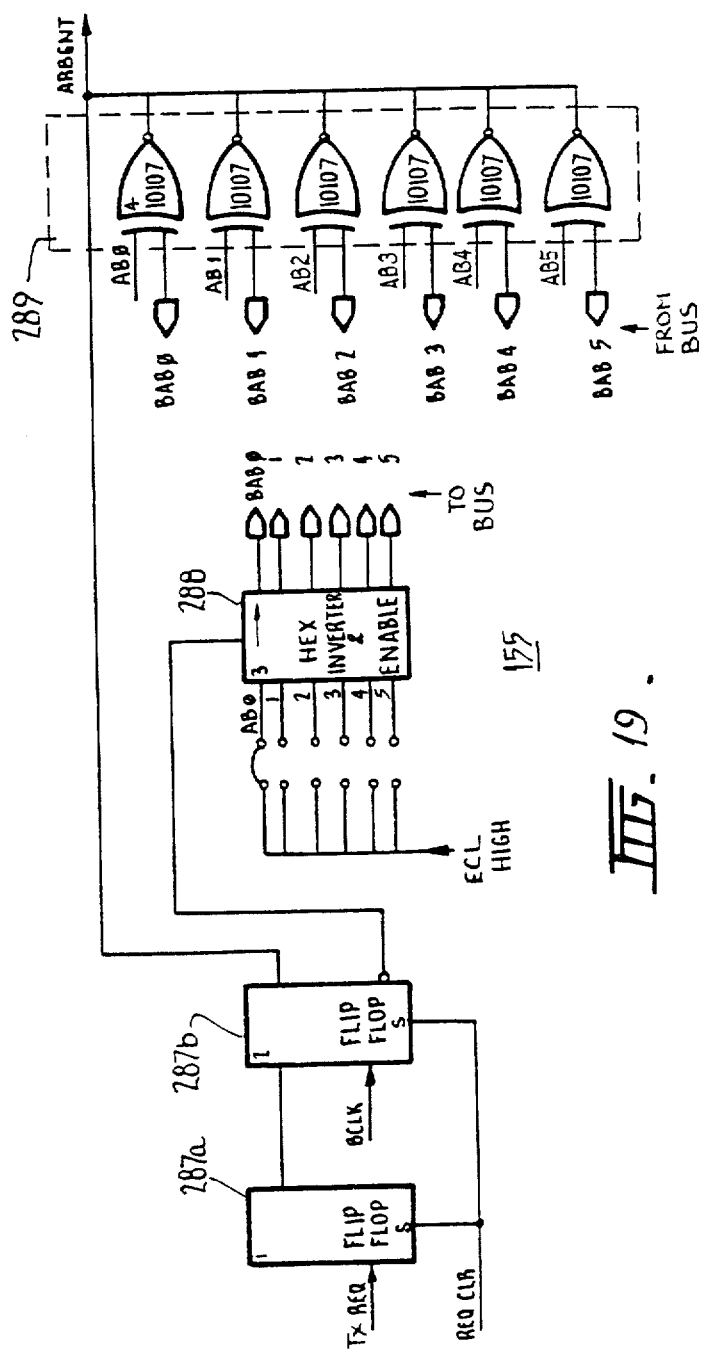
FIG. 19 is a block circuit diagram of bus arbitration logic.

Also illustrated in FIG. 8A is the arbitration/priority logic circuitry 155 utilized to gain to the bus 5 as well as to provide a priority selection mechanism in the event of simultaneous access requests. The arbitration/priority logic circuitry 155 is responsive to the device 3 for receiving transfer request (Tx Req) signals from the device 3 requesting transfer of data. The details of the arbitration/priority logic circuitry 155 are shown in FIG. 19.

The receiving portions of the interface 7 are also seen to include a device status receiving circuitry 157 utilized to receive the Device Busy and Device Acknowledge signals from the bus 5 and to detect same for providing an indication to the transmitting device 3 as to whether the transmitted data was received or whether the target device to which the data is to be sent is busy. Appropriate receiving device acknowledge signals (REC Ack) and receiving device busy signals (REC Busy) are fed to the device 3. A transaction done signal (Tx Done) is also generated from the device status receiving circuitry 157 and fed to the device 3 to indicate that the data transfer is complete. The transaction done signal is also fed to the type encoder circuit 153. Further, the device status and receiving circuitry 157 receives an arbitration grant signal (ARBGNT) from the arbitration/priority logic circuitry 155 indicating that arbitration has been granted to the device 3, and thus, data may be strobed from the latch and transmitting circuits 151 to the bus 5.

An output data enable signal (ODE) is provided by the device status and receiving circuitry 157 for strobing the data stored in the latch and transmitting circuits 151 onto the bus 5. In strobing the data from the latch and transmitting circuits 151 to the bus 5, the data is not destroyed but is retained in the latches in the event that the intended target device is busy. If the target device is busy, the device status receiving circuitry 157 receives the Device Busy signal and provides the information to the transmitting device 3 by means of the REC Busy signal. The sending device 3 may then retransmit the data by means of the transmission request signal. The request clear signal is generated by the device status receiving circuitry 157 and transmitted to the arbitration/priority logic circuitry 155 to reset various flip-flops therein, and is additionally fed to the device 3 to indicate that the data stored in the latch and transmitting circuits 151 have been placed on the bus but that a Device Busy or Device Acknowledge signal has not yet been received.

The interface circuits associated with memory, I/O controller devices and CPU devices are largely the same with the major difference being that there is no device address associated with a transmission to a CPU. In operation, any CPU which has the same process code may operate on the received data, and thus the process code provides the mechanism to bind together memory, I/O controllers and CPUs to carry out a particular process or task.

Set forth below is a more detailed description of the various circuits forming the interface of FIGS. 7A and 8A.

FIG. 9 shows the level 1 latch 101 and level 2 latch 103 for the data field of the receiver section of interface 7. It should be appreciated that identical circuitry is provided for each of the other fields shown in FIG. 6. For example, similar latching circuitry is provided for the Target Code, Sender Code, Device Address and Bus Transfer Type fields. The only exception is the case in which the device is of the type (not shown) which can receive the ECL logic off the bus directly. In the implementation herein, and as depicted in FIG. 9, the latching is done with the ECL Logic on the bus 5 by receiver flip-flops 202, for example, Motorola Model No. MC 10186. This latching occurs during the clock periods in which the signals are placed on the bus 5. These latched signals are referred to level 1 signals. Once the level 1 signals are latched in the receive flip-flops 202, they are transferred on receipt of a system bus clock pulse to the level 2 latches, flip-flops 204. FIG. 10 shows similar latching for providing transmission of the data signals from the device to the bus except that these signals are latched in the transmission clock period. In this case, the latches are latch/transmitter device 302, for example, MC 10129 wherein the TTL logic of the device is converted to the ECL bus logic. Again, if the device is of the type which can transmit the ECL logic directly to the bus, then simple latching circuits may be employed. Similar circuits as shown in FIG. 10 are provided for each of the other fields shown in FIG. 6 as needed for the transmission cycle in a similar fashion as explained in reference to the receiving section of each interface as shown in FIG. 9.

The parity generators and parity receivers are not shown in FIGS. 9 and 10 as these circuits are well known to one of ordinary skill in the art. However, it should be noted that the parity signal is latched off the bus and transmitted onto the bus so as to enable a parity error detection to be incorporated in the match detection for enabling the transmitting device to be made aware if there has been a parity error by the absence of a Device Busy or Device Ack signal. Thus, it can be seen that the signals appearing on the bus 5 circuit lines are latched and passed to the next stage of the interface 7 during the subsequent clock period.

When interface 7 is in the receive mode, the latched data is passed through the match condition circuitry as outlined in the block diagram of FIG. 7. The match condition circuitry for a memory device 3 is now set forth in detail.

FIGS. 11-15 show the schematic diagrams for determining a match condition for the Process Code (i.e., Target Code) field, Address field and Transfer Type field for a memory device 3. FIG. 11 illustrates multiplexers 105 in the form of a plurality of Quad 2 input multiplexes 220 such as, for example, Model No. MC 101158. The logic signal CNRL SEL on the control select lines of multiplexes 220 determine which group of data, level 1 or level 2, will be passed through to the comparator means 109 of FIGS. 12 and 13. The comparator means of FIG. 12 take the form of 8×2 bit content addressable memories 240, as for example, Signetics Model No. 10155. In an associate mode of operation, as for example effective with level 2 data as input data, the memories 240 compare the input level 2 data with the stored memory data. A match condition is indicated by one of the output lines at pins 2-5, 14-17 going low, and these match signals are fed along lines PM0-PM15 to circuits shown in FIGS. 13 and 14. In a writing mode of operation, data is written into the memory cells of memories 240 which correspond to address and process codes. This procedure is used in the interface register addresses, effective for reassigning process task to different segments of the total virtual memory space defined by all memory devices 3, or in initially loading the memory cells. The memory cells thus serve as registers or pointers for identifying the address of a memory page.

Figure 13:
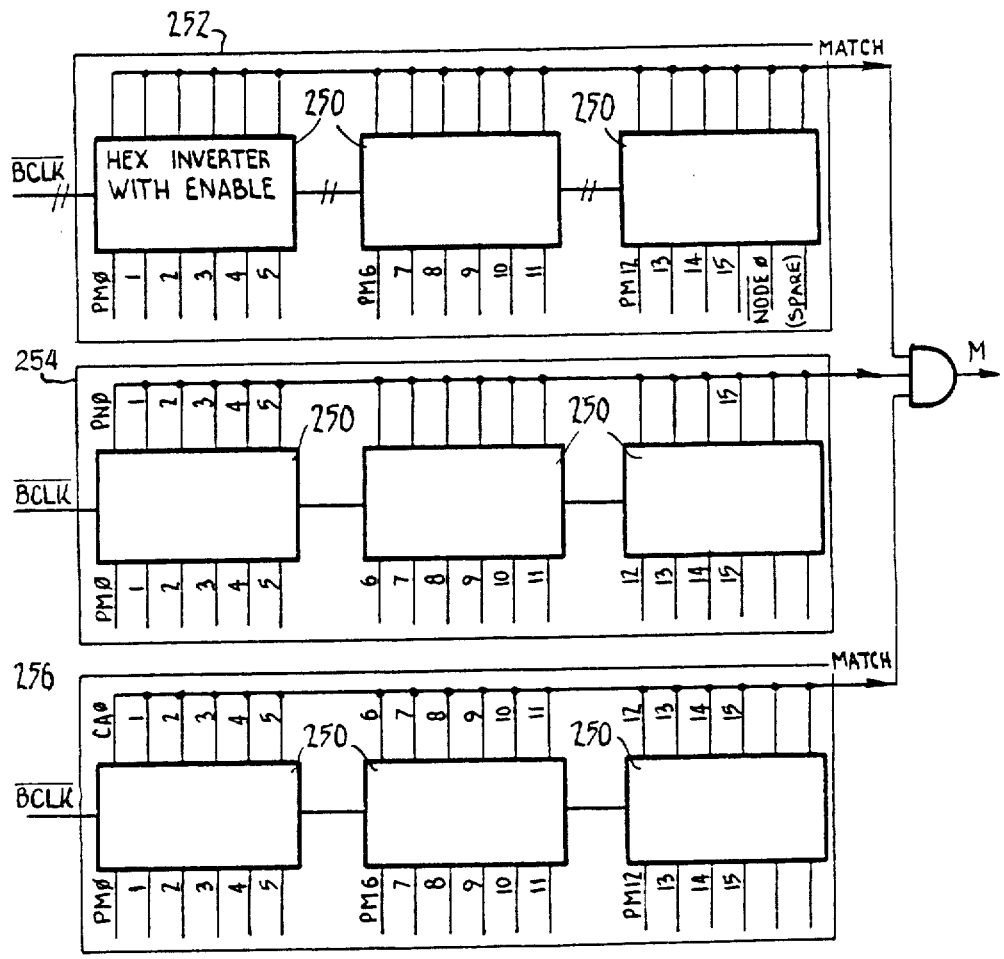
FIG. 13 is a block circuit diagram of match signal generating means.

The low logic output signals, indicating a match condition, are fed to a plurality of hex inverters 250 as, for example, Model MC 10189 (FIG. 13). The inverters 250 are enabled by the inverse of the clock pulse, BCLK, and, when enabled, a logic high signal is generated at one output thereof corresponding to the low logic input signal. Three sets of inverters are illustrated. Inverter set 252 corresponds to the address field match condition, set 254 corresponds to the transfer type field match condition, and set 256 corresponds to the process code field match condition. For a match condition, only one output of each sets 252, 254, 256 will be high. The outputs of each set of inverters are wire-ORed together and fed to AND gate 260. A high output of AND gate 260 indicates a match condition for the relevant fields, e.g., Address, Type and Process Code. The match condition signal at the output of AND gate 260 is used together with the parity check signal generated by parity checking device 117 as inputs to AND gate 280 (FIG. 7). The resultant match condition signal is used together with the transmission complete, Tx Comp, signal from device 3 to enable data to be latched into the level 3 latch 119 from the level 2 latch 103.

The page encoder circuit 135 for addressing the page memory of the memory device 3 is shown in FIGS. 14 and 15. FIG. 14 illustrates a plurality of Quad ECL-to-TTL converters 270, for example, Model No. MC 10125, which are used to convert the ECL logic signals provided from the outputs of content addressable memories 240 into TTL logic. These TTL logic signals are compatible with the IC logic of FIG. 15 which illustrates a page address encoder circuit 272 employing a plurality of 8-line to 3-line encoders 274, for example, Texas Instruments Model No. 74LS348. The encoders 274 provide 3-line binary (octal) encoding for addressing the page memory of the memory device 3.

The use of memory is organized around a page size of 4K words using 16K RAM's. This implies a total number of pages per module/device of 16. Within the framework of each interface, each address code falls within a particular page and thus the address referencing at the device level is organized as a page address and an address within a page.

Figure 12:
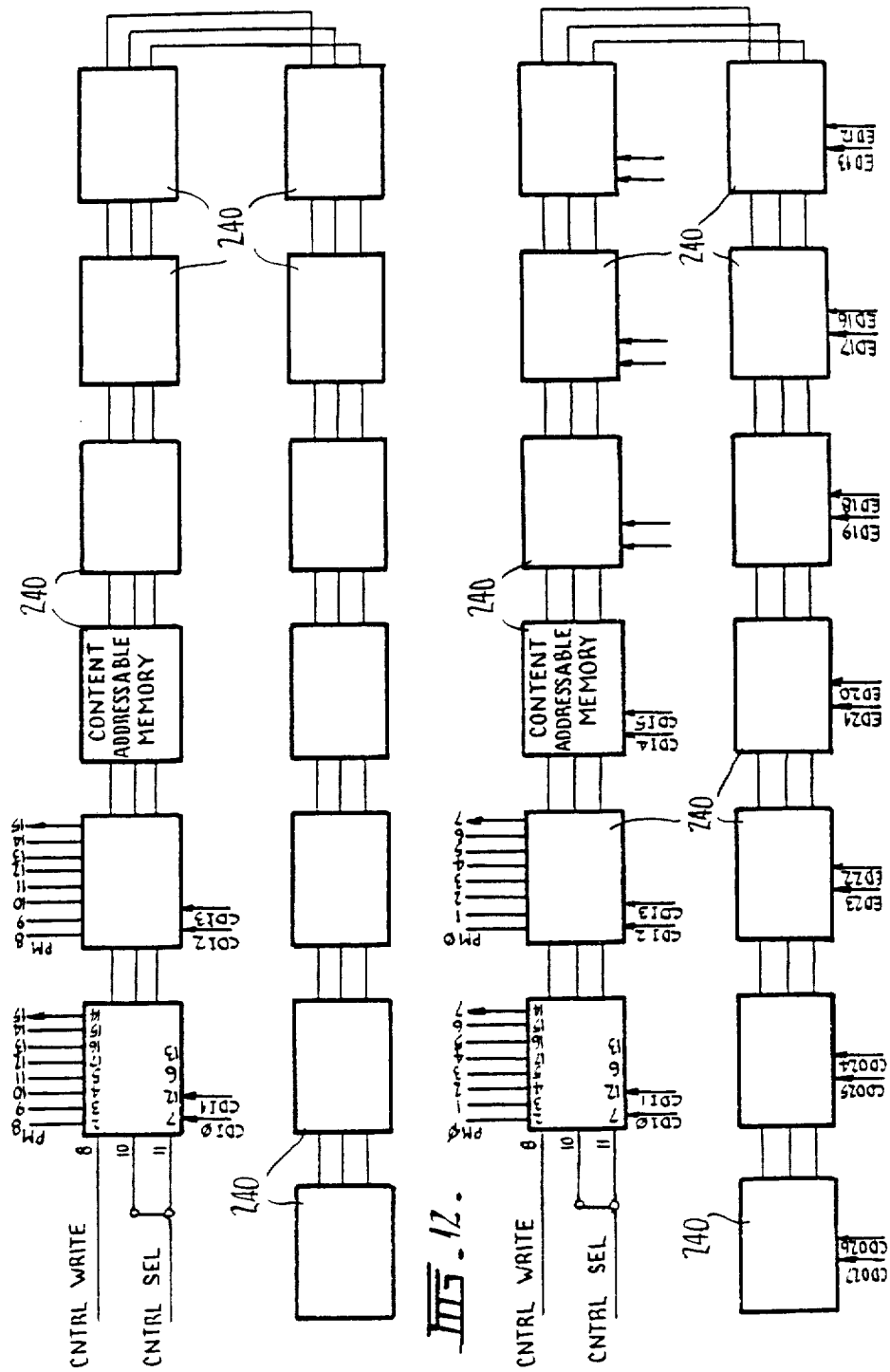
FIG. 12 is a block circuit diagram of a match detection means in the form of content addressable memories.

It will be appreciated that the content addressable memory match detection circuit of FIG. 12 is repeated for each of the process code (Target Code), Address Code and Transfer Type fields. A transfer of the data only occurs when there is a match signal generated by each of three sets of the inverters 252, 254 and 256.

It may be appreciated that for other devices on the bus such as processors, similar circuitry of FIG. 12 is used for enabling the registers to be dynamically changed.

FIG. 16 is a chart showing a representative transfer type bit encoding scheme. Illustrated are the type of transaction and the bit, high or low pattern therefor and whether the transaction is issued by a processor or whether it is sent or issued by a memory device.

Figure 17:
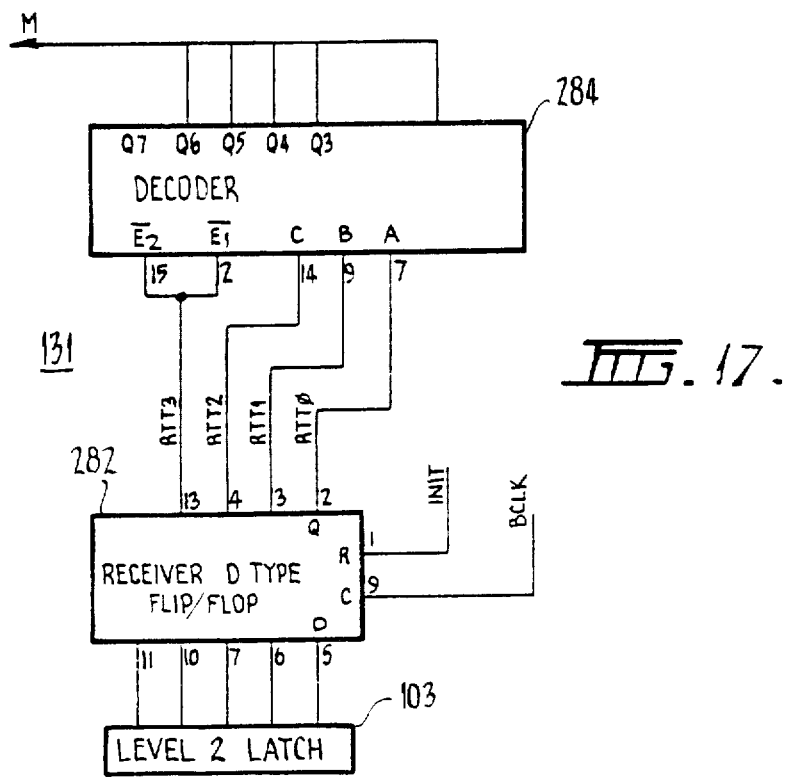
FIG. 17 is a block circuit diagram of a decoder of the interface used to decode transfer type codes.

FIG. 17 shows an alternate circuit arrangement which may be utilized for the transfer type comparison instead of the content addressable memory circuits of FIG. 12. Transfer type data from the level 2 latch is trannsferred to a flip-flop 282 (Model No. 10186) and in the next clock period, the data is transferred to a decoder 284 (for example, Model No. MC 16162). The decoder is set to recognize a particular pattern of signals on the transfer type data lines in accordance with whether the device connected to the decoder is a memory or a CPU (processor). The type match detection signal at the output of decoder 284 is fed to AND gate 260 to provide a type match indication. It will be appreciated that a memory device can only perform certain functions, and similarly a CPU can only perform certain other functions, and hence, the decoders 284 are preset to recognize these functions by assigned code recognition. The use of the redirect bit in the transfer type (FIG. 16) allows the setting up of a particular interface to accept transactions which have not been accepted by any of the other interfaces on the bus.

Figure 17A:
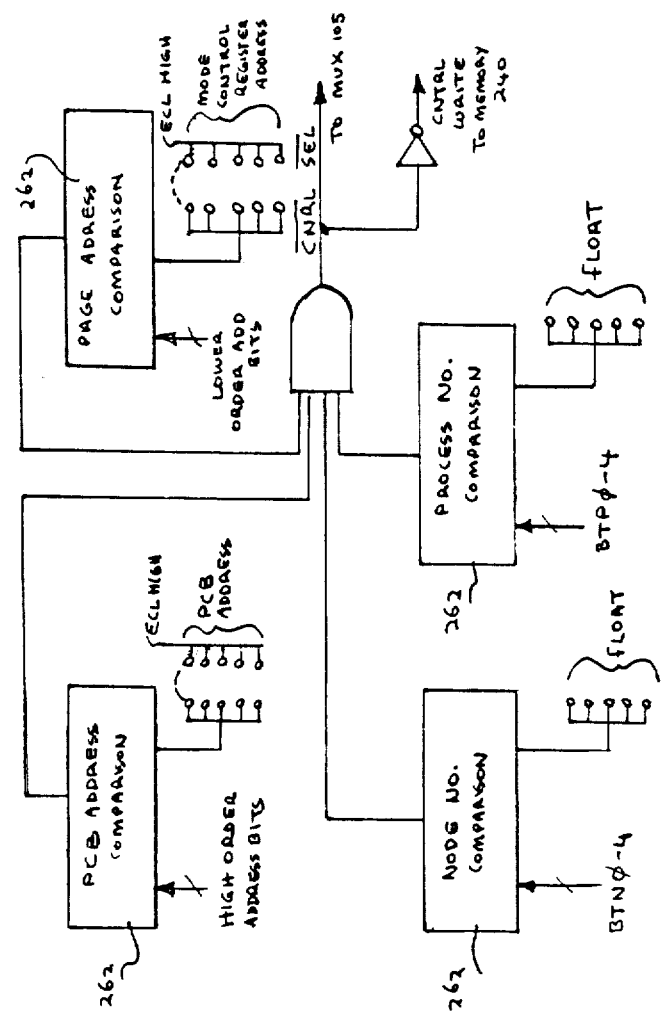
FIG. 17A shows decode logic circuitry for decoding a default register address within the interface

The register address circuit 107 is illustrated in FIG. 17A and is seen to comprise device address and process code comparison circuits 262 utilizing Model No. MC 10166 comparators. The control registers serve as pointers to memory pages in the device memory 3, and each pointer is associated with a particular process code. In this fashion, blocks of virtual memory may be tied to processes which are being executed by one or more processors. A predetermined process code is utilized to signify that the incoming data is to be utilized to modify the process codes stored at the designated page address. The new process codes and the page addresses to be associated therewith are stored in the data fields of the level 1 latch 101 and are written into the content addressable memories via the multiplexer 105.

FIG. 18 shows the transfer type transmission circuit 153 which is the counterpart transmission circuit for the type decoder 131 of FIG. 17. The circuit converts the transfer type signal generated in the transmitting device into a coded format which is to be placed onto the bus 5. It can be seen that flip-flop 285 (Model No. MC 10131) is set by the device redirect signal and is cleared by the transfer done (TX DONE) signal. The signals DMERR & EMERR from the device set the transaction types to be transmitted and they originate from the transmitting devices themselves (typically a CPU or controller). It should be understood that combinations of these signals produces the required type transaction signals. A Hex Inverter and Enable Circuit 286 (Model No. MC 10189) is enabled by the ODE (output data enable) signal and is operated to provide the required type code for the duration of the clock period when the transition is placed on the bus.

The arbitration/priority logic circuitry 155 is shown in FIG. 19. A transmission request (Tx Req) signal is initiated by the device 3, and this signal passes to two flip-flops 287a and 287b (Model No. 10131) which are used to synchronize the transfer request signal with the bus clock. When synchronization occurs, flip-flop 287b provides two outputs, one of which passes to a Hex Inverter and Enable Circuit 288 which is set (strapped) to a particular code. The Hex Inverter and Enable Circuit 288 generates a particular code at its output, and this code is used for comparison purposes by the exclusive OR comparators 289 (Model No. MC 10107) which have their outputs coupled with the other output of flip-flip 287b. The terminals BAB0—BAB5 at one input of comparators 289 are connected directly with the bus arbitration lines on the bus. The other inputs to comparator 289 are connected to receive the hard wired strapped outputs AB0-AB5 which also feed the Hex Inverter and Enable Circuit 288. Thus, if the output signals of the Hex Inverter and Enable Circuit 288 correspond with the signals on the bus, (indicating that there is no other transaction on the bus) then a match condition exists and bus access (arbitration) can be given to the requesting device.

Only six lines are required to allow arbitration across all devices on one system bus 5.

The arbitration system is essentially a binary tree of six levels. Each device is assigned a unique six bit code which is a function of its physical location on the bus 5. Each bit effectively indicates a two-way branch. When arbitration is required, the device firstly inputs onto the arbitration signal lines its arbitration code, and then, at the end of the arbitration cycle checks to see if the OR-ed result equals its own arbitration code.

If the result is true, then the next bus cycle belongs to the requesting device. If it is false, then the device must repeat the arbitration request. A false result always means some other device of higher priority has gained arbitration. There are no wasted clock cycles.

Each bit of the artibration code actually indicates an arbitration direction for that particular branch of the tree. For example, a system of two devices can be assigned the one bit codes 0 and 1 corresponding to one tree with one branch. Thus, by feeding onto the bus either a 0 or 1 and subsequently checking for a match decision, one can always decide which device has access. It should be noted that the device with an arbitration code of 1 has priority over a 0 code for a negative true (low true) wired OR-ed arbitration bus.

This simple system can be extended by simply adding two branches to the existing branch and adding another bit to the arbitration code. The result is arbitration across four devices or two groups of two. The first branch arbitrates between groups as this branch is common to all devices, and each of the two new branches arbitrates between devices common to that branch only.

This is the important criterion, that each branch can divide into two or more branches corresponding to two devices. Thus, if the number of branches is N, then a maximum of 2N devices are possible. The resultant priority is such that devices have a linearly increasing priority as their position nears the end of the bus which has a priority code of $77_8$.

Figure 20:
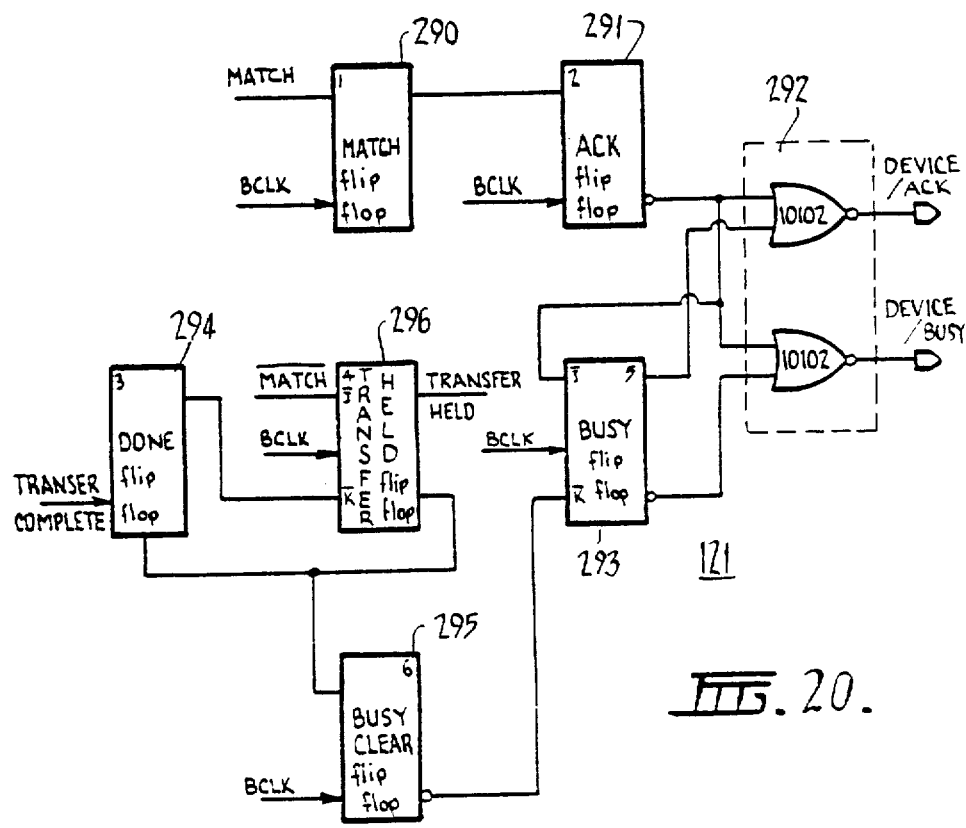
FIG. 20 is a block circuit diagram of Device Acknowledge Device Busy circuits for a receiving mode.

FIG. 20 illustrates the details of the Device Status circuitry 121 (FIG. 7). The circuit 121 is used for generating the Device Ack or the Device Busy signals. The match condition signal from the output of AND gate 280 is fed into a flip-flop 290 (Model MC 10131) which, in turn, passes its output to a further flip-flop 291 during the next clock period. Flip-flop 291 has an output which feeds a pair of Exclusive OR comparators 292 (Model MC 10102). These comparators are, in turn, controlled by a "busy" flip-flop 293 which is controlled by a series of flip-flops 294, 295 (Model MC 10131) and 296 (Model MC 10135) which receive the transfer complete signal from the device, and the inverse match condition signal from AND gate 280. These signals are utilized to gate the busy flip-flop 296 so that either the Device Ack or the Device Busy signals are generated. The transfer complete signal is provided from the device connected to the interface from within its own circuitry to indicate that the device is not busy. The transfer held signal passes to the device to indicate to the device that data is available in the interface latch 119.

Figure 21:
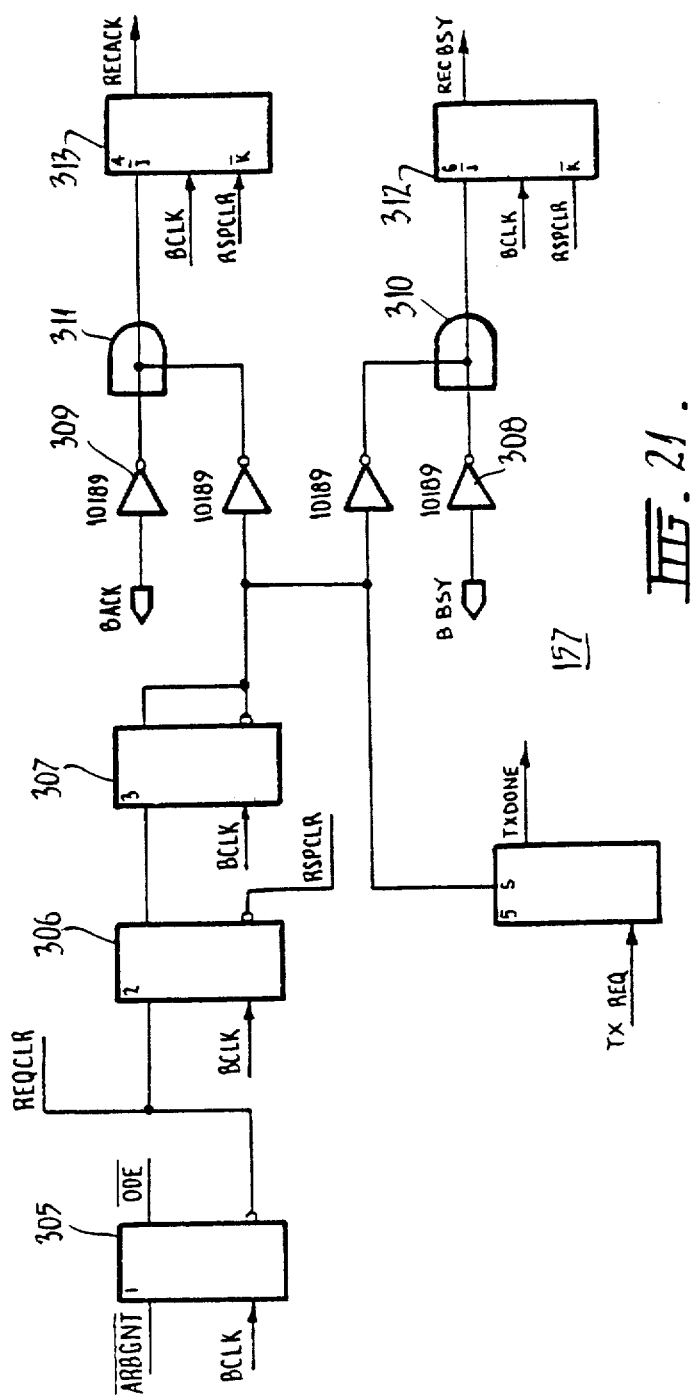
FIG. 21 shows circuitry of the interface for receiving the Device Busy and Device Acknowledge signals.

Referring now to FIG. 21, there is shown the device status receiving circuitry 157. This circuit has a flip-flop 305 which receives an arbitration grant signal ARG-BANT from the arbitration/priority logic circuitry 155 (FIG. 19), and provides the output data enable (ODE) signal used to transfer transactions onto the bus. The other output from flip-flop 305 is the Req. Clr. signal fed to set flip-flops 287a-287b of FIG. 19 and to the transmitting device to indicate that data has been transmitted but not yet acknowledged by the receiving device. The Req. Clr. signal is also passed to a series of further flip-flops 306 and 307 which act as time delays to synchronize the receipt of the Device Busy or Device Ack signals on the circuit of FIG. 20 with the correct clock cycle after arbitration is provided. The Device Busy and Device Ack signals pass into inverters 308 and 309 which, in turn, provide outputs to logical AND gates 310 and 311. The AND gates 310 and 311 switch either of the two flip-flops 312 and 313 into states to provide the REC Ack (Receive Acknowledge) signal or the REC Busy (Receive Busy) signal consequent on the receipt of Device Ack or Device Busy signals respectively. The transmitting CPU is thus operative to examine its input lines for receipt of RECACK and RECBSY signals on the next clock pulse after the Device Ack or Device Busy are received.

FIG. 22 shows a chart of functions of the circuits in the interface during successive clock periods. The chart is divided into receiver section and transmitter section. In the receiver section, it can be seen that during a first clock period there is a first level latch of data, i.e., data is latched into latch 101. During subsequent clock period there is the second level latch and match detection. The second level data latching is done by means of the level 2 latch 103. Subsequent match detection is done by means of the comparison means 109 and the AND gate 260. Parity checking is also done at this time. During the third clock period the data is put into the level 3 latch 119 and passed to the device. During the fourth clock period a Device Busy or a Device Ack signal is generated. The various horizontal rows indicate the overlapping sequence of different transactions performed by different interface circuits so that transactions can be occurring simultaneously but in different clock periods in the interfaces. In the transmission section, it can be seen that during a first clock period there is arbitration on the bus which follows an arbitration request during the preceding clock period. Once arbitration is obtained, then the data is transmitted during the next clock period immediately following arbitration grant, and then three clock periods later the Device Busy or Device Ack signal is detected. It can be seen by checking the vertical column that the functions of the receiver and transmitter coincide for their respective duties. The second horizontal row of the transmitter section shows how subsequent transactions can occur simultaneously to the first but during a subsequent clock period.

It can be appreciated from the above description of the preferred embodiment that the various circuits provide latching of each section of the transaction, a match condition determination and then if there is a match condition, a transfer of the data part of the transaction to the device connected to the interface. When data is being transmitted from a device, an arbitration system provides an orderly priority system of access to the bus and provides that the data is transmitted together with the process code, address code, and type code. Device Busy or Bus Ack signals are provided at predetermined clock periods after transmission of transactions and thus control of transactions on the bus is established.

The concept of using the codes for the transactions to identify particular devices (memory devices, I/O controllers, processors, etc.) on a computer system can be appreciated by understanding the rates of processing of transactions. For example, the system bus has a transaction rate of 30 nanoseconds. The memory read/write cycle has a transaction of 500 to 700 nanoseconds. The CPU cycle time is between 300 to 400 nonseconds. Thus, it should be appreciated that transactions on the bus can be passing between the different devices for some processes while memory and/or CPU's are performing their respective task on a particular transaction for different processes. This enables a large number of logic data paths between communicating devices on the bus.

The input and output of data into and off the system is by way of any suitable input/output means. For example, a keyboard entry device and a printer output device may be utilized. An input/output controller acting as a general purpose controller for these devices may also be employed. The controller may, for example, be in the form of a disc controller where the disc functions are not utilized. A typical disc controller suitable for this purpose is one sold under the trade name ZYLOGIC, Model No. ZAC780. The micro-circuitry in the disc controller is programmed to suit the desired functions of the transactions (for example, read, write, etc.) which are passed on or off the bus. The disc controller is connected to an interface of the type described, so that the connection between the bus and the input/output device is through the disc controller and interface.

When the system is initially started up, none of the processors 1 or memory devices 3 have process codes assigned thereto. A processor 1 has a program stored in its ROM's which is set by a user for the particular function to be performed by the system. This program places a transaction onto the bus 5 from the processor 1, which then assign a process code to particular memory device 3 required to store data. The process code is the same process code as that of the processor 1 so that particular memory device is tied with the processor by the same process code.

A boot-strapping operation is then performed on the system. The boot-strapping operation per se is generally known in computer arts. In the boot-strapping operation, a particular processor 1 issues a series of write request transactions to specific page frames or groups of pages in a particular memory device 3. The processor, having already assigned a process code to itself as well as other memory units through their respective interface 7, then writes a series of write request transactions into the interface 7 of a particular input/output controller. The write request transactions at the controller form a command sequence which causes the controller to respond with a series of write request signals to memory. The controller then issues a mailbox transaction to the processor to commence execution of the loaded program. The function of this program would be to further boot-strap other programs which would ultimately enable the full utilization of the system.

In the embodiment described in detail, the transaction is placed onto the bus, with all the process code addresses, device code addresses, data addresses, transaction type control signals and data signals during one clock period. It should be appreciated, however, that the transaction may be such that it is presented to the bus in a series of dissected portions each presented in adjacent clock pulses. In this case, the interfaces would be arranged to transmit the dissected portion of the transaction signals in successive clock periods, with the various addresses and type signals appearing in the subsequent clock periods. On receipt of a first transaction signal, the interface would then examine the bus for a known number of successive clock periods so that a total transaction can be reconstituted and an overall code address match made. Such a construction is to be included within the scope of the invention.

It should be appreciated that in the embodiment described a group of processors or one processor could be included, if desired, to manage allocation of resources within the computing system. The necessity for a dedicated controller must be related to the user task allocation. Equally the task could be performed by one or more processors as part of its computing workload. As such conventional operating system techniques can be applied to the computing system to enable multi programming and multi processing.

It should be recognized that any controlling structure could make use of the redirect bit previously described, so as to provide organized control of errors and resources.

What is claimed is:

1. A multiple instruction multiple data system for concurrently processing data for a plurality of separate processes comprising:
    (a) a first and second central processing unit,
    (b) a first and second memory device,
    (c) a bus,
    (d) at least one of said first and second central processing units operable together with at least one of said first and second memory devices for executing at least a first and second of said plurality of separate processes,
    (e) first and second interface means respectively connecting said first and second central processing units to said bus, and third and fourth interface means respectively connecting said first and second memory devices to said bus,
    (f) said first interface means generating a first transaction code including a first process code identifying a first process to be executed by said first central processing unit and a first data field,
    (g) said second interface means generating a second transaction code including a second process code identifying a second process to be executed by said second central processing unit and a second data field,
    (h) said third interface means receiving said first and second transaction codes and including:
        (1) means for storing an assigned process code,
        (2) means for comparing said stored, assigned process code with said received first and second process codes and for generating a match signal when said stored, assigned process code is equal to one of said first and second process codes,
        (3) means for receiving said first and second data fields, and
        (4) means for feeding one of said received first and second data fields to said first memory device in response to said match signal, said first data field being fed when said stored, assigned process code is equal to said first process code, and said second data field being fed when said stored, assigned process code is equal to said second process code,
    (i) said fourth interference means receiving said first and second transaction codes and including:
        (1) means for storing an assigned process code,
        (2) means for comparing said stored, assigned process code with said received first and second process codes and for generating a match signal when said stored, assigned process code is equal to one of said first and second process codes,
        (3) means for receiving said first and second data fields, and
        (4) means for feeding one of said received first and second data fields to said second memory device in response to said match signal, said first data field being fed when said stored, assigned process code is equal to said first process code, and said second data field being fed when said stored, assigned process code is equal to said second process code,
    (j) means for assigning said first process code for storage in said third interface means,
    (k) means for assigning said second process code for storage in said fourth interface means
    whereby said first central processing unit and said first memory device execute said first process and said second central processing unit and said second memory device concurrently executes said second process, and
    (l) means for dynamically modifying said assigned first and second process codes whereby said first and second memory devices may be dynamically reassigned to the same or different process codes and thus to the same or different processes executed by said first and second central processing units.

2. A system as recited in claim 1 further including clock generating means for generating clock signals into said bus and wherein said means for generating said first and second transaction codes includes means for generating said codes at successive clock signals on said bus.

3. A system as recited in claim 1 wherein said third and fourth interfaces means each include means for generating a device busy and device acknowledge signal and means for feeding same into said bus at a predetermined time interval after receipt of said first and second transaction codes respectively, and said first and second interface means includes means for receiving said device busy and device acknowledge signals, whereby said transaction codes may be retransmitted upon receipt of a device busy signal.

4. A system as recited in claim 3, wherein said first and second interface means each include arbitration logic circuits for accessing said bus, said arbitration logic circuits operative for indicating whether said bus is available for access by said first and second interface means.

5. A system as recited in claim 4, wherein said arbitration logic circuits include priority selection means wherein simultaneous requests for access to said bus are selected on a priority basis.

6. A system as recited in claim 4, wherein said first and second transaction codes each further include a device address for indicating the address in said memory device in which said data field is to be read or written.

7. A system as recited in claim 6, wherein said first and second transaction codes each further include a type code indicating one of a plurality of types of transaction codes.

8. A system as recited in claim 3 further including a clock generating means for generating clock signals onto said bus, said predetermined time interval being the third clock signal after transmission of said transaction code.

9. A system as recited in claim 3, wherein each of said third and fourth interface means includes first, second, and third latches connected in series for feeding at least said data fields therethrough to said memory device, whereby data flow through said interface is enhanced by a pipeline structure.

10. A system as recited in claim 1, wherein said first and second interface means each include arbitration logic circuits for accessing said bus, said arbitration logic circuits operative for indicating whether said bus is available for access by said first and second interface means.

11. A system as recited in claim 10, wherein said arbitration logic circuits include priority selection means wherein simultaneous requests for access to said bus are selected on a priority basis.

12. A system as recited in claim 1, wherein said first and second transaction codes each further include a device address for indicating the address in said memory device in which said data field is to be read or written.

13. A system as recited in claim 12, wherein said first and second transaction codes each further include a type code indicating one of a plurality of types of transaction codes.

14. A system as recited in claim 1, wherein each of said first and second interface means include first, second, and third latches connected in series for feeding at least said data fields therethrough to said memory device, whereby data flow through said interface is enhanced by a pipeline structure.

15. A system as recited in claim 1, wherein said third and fourth interface means further include means for generating a third and fourth transaction code including said first and second process codes respectively and third and fourth data fields respectively, said first interface means receiving said third and fourth transaction codes and including:
(1) means for storing an assigned process code,
(2) means for comparing said stored, assigned process code with said received first and second process codes and for generating a match signal when said stored, assigned process code is equal to one of said first and second process codes,
(3) means for receiving said third and fourth data fields,
(4) means for feeding one of said received third and fourth data fields to said first central processing unit in response to said match signal, said third data field being fed when said stored, assigned process code is equal to said first process code, and said fourth data field being fed when said stored, assigned process code is equal to said second process code, said second interface means receiving said third and fourth transaction codes and including:
(1) means for storing an assigned process code,
(2) means for comparing said stored, assigned process code with said received first and second process codes and for generating a match signal when said stored, assigned process code is equal to one of said first and second process codes,
(3) means for receiving said third and fourth data fields,
(4) means for feeding one of said received third and fourth data fields to said second central processing unit in response to said match signal, said third data field being fed when said stored, assigned process code is equal to said first process code, and said fourth data field being fed when said stored, assigned process code is equal to said second process code, means for assigning said first process code for storage in said first interface means and means for assigning said second process code for storage in said second interface means.

16. A system as recited in claim 15, wherein said first and second interface means each include means for generating a device busy and device acknowledge signal and means for feeding same into said bus at a predetermined time interval after receipt of said third and fourth transaction codes respectively, and said third and fourth interface means includes means for receiving said device busy and device acknowledge signals
whereby said transaction codes may be retransmitted upon receipt of a device busy signal.

17. A system as recited in claim 15, wherein said third and fourth interface means each include arbitration logic circuits for accessing said bus, said arbitration logic circuits operative for indicating whether said bus is available for access by said third and fourth interface means.

18. A system as recited in claim 17, wherein said arbitration logic circuits include priority selection means wherein simultaneous requests for access to said bus are selected on a priority basis.

19. A system as recited in claim 18, wherein each of said first and second interface means includes first, second, and third latches connected in series for feeding at least said data fields therethrough to said central processing units whereby data flow through said interface is enhanced by a pipeline structure.

20. A system as recited in claim 15 further including means for modifying said assigned first and second process codes whereby said first and second memory devices and said first and second central processing units may be dynamically assigned to the same or different process codes and thus operative for cooperatively executing the same or different processes.

21. In a computing system for concurrently executing a plurality of processes on a data set, a tightly coupled communication system for interconnecting a plurality of central processing units with a plurality of memory devices and I/O devices for executing said plurality of processes comprising:
(a) a bus, (b) interface means interconnecting each central processing unit to said bus and each device to said bus, each interface means including means for generating a transaction code and transmitting same along said bus, each transaction code including:
  (1) a process code identifying one of said plurality of processes,
  (2) a data field to be transmitted along said bus, and to be received from said bus,
  (3) a type code indicating whether the receiving interface is connected to one of said central processing units or one of said devices,
(c) each interface means further including:
  (1) means for receiving said transaction code transmitted along said bus from another interface means,
  (2) means for storing as assigned process code and an assigned type code,
  (3) means for comparing said assigned process code with said received process code and for comparing said assigned type code with said received type code,
  (4) means for feeding said received data field to said connected central processing unit or device only if said both assigned codes are equal respectively to both received codes,
  (5) means for feeding a status signal onto said bus in response to said comparing means for indicating said code equality, and
(d) means for dynamically modifying said process codes for assigning selected central processing units and selected devices for execution of selected processes
whereby said central processing units and devices having the same process code cooperatively execute one of said processes, and different central processing units and devices having different process codes cooperatively execute different processes.

22. A system as recited in claim 21 further including a clock generating circuit coupled to said bus for generating bus clock signals, said transmission codes generated on said bus at regular bus clock signal intervals.

23. A system as recited in claim 22, wherein said regular intervals include each bus clock signal.

24. A system as recited in claims 22 or 23, wherein said bus clock signal has a period on the order of 30 nanoseconds.

25. A system as recited in claim 22, wherein said feeding means is responsive to said bus clock signals and operative for feeding said status signal onto said bus after a predetermined number of clock signals from the receipt of said transaction code.

26. A system as recited in claim 25, wherein said transaction code generating means is responsive to said bus clock signals and includes means for generating said transaction code in an interleaved fashion at bus clock signal intervals less than said predetermined number of clock signals.

27. A system as recited in claim 25, wherein said status signal is a device busy or device acknowledge signal.

28. In a computing system having a plurality of data processing units, memory devices and I/O devices, wherein selected ones of said central processing units are dynamically assigned to cooperatively operate with selected ones of said devices for executing selected ones of a plurality of processes, a plurality of interfaces, one interface coupled to each of said plurality of data processing units and devices and to a communication bus, each interface comprising:
(a) transaction code generating means including process code generating means and data field generating means for enabling a transmitted transaction along said communication bus to include these codes and
(b)
  (1) means for storing an assigned process code and
  (2) means for comparing said assigned process code with a process code in a transaction on said bus and
  (3) match signal generating means for generating a match signal if the compared process code is equal to the assigned process code
  (4) means for receiving said data fields in a transaction on the bus and
  (5) means for feeding said data fields to the respective device in response to said match signal being generated so that a received transaction code will pass to the respective device if the process code corresponds with the assigned process code.

29. An interface as claimed in claim 28 including means for enabling modification of said assigned process code whereby the respective device may be dynamically reassigned to the same or a different process code, whereby to enable the respective device to operate on the same or a different process within the system.

30. An interface as claimed in claim 29 including means for generating a device busy signal and a device acknowledge signal and means for feeding same to said bus at a predetermined time interval after receipt of a transaction code where said process code generates a match signal
and also means for receiving a device busy signal and a device acknowledge signal after said predetermined time interval after transmission of a transaction code to said bus
and means for permitting retransmission of said transaction code upon receipt of said device busy signal.

31. An interface as claimed in claim 28 including an arbitration logic circuit for accessing said bus and wherein said arbitration logic circuit includes arbitration priority selection means whereby respective devices can be assigned priority of access to said bus.

32. An interface as claimed in claim 28 wherein said process code generating means includes device address generating means and transaction type code generating means and said process code storing means includes device address storing means and transaction type storing means.

33. A method of tightly coupling a plurality of central processing units, memory devices and I/O devices for cooperatively executing a plurality of processes comprising the steps of:
(a) assigning each central processing unit and device a process code,
(b) connecting each central processing unit and device to a bidirectional bus through a respective interface,
(c) generating a clock signal along said bus,
(d) selectively communicating between said central processing units and devices via a transaction code transmitted and received along said bus, each transaction code including a process code for identifying said process and being transmitted during a first predetermined number of clock signals, (e) selectively communicating between said central processing units and devices a status signal after a second predetermined number of clock signals after receipt of a transaction code, and (f) dynamically reassigning said process code to said central processing units and devices for performing selected different processes.

34. A method as recited in claim 33, wherein said first and second predetermined number of clock signals has a time interval much less than the data access cycle time of said central processing units and devices.

35. A method as recited in claim 34, wherein said clock signals have a period on the order of 30 nanoseconds and said first and second predetermined number of clock signals are each less than 10 clock signals.

36. A method as recited in claim 34, wherein said clock signals have a period on the order of 30 nanoseconds and said first predetermined number of clock signals is one and said second predetermined number of clock signals is three.

37. A method as recited in claim 36, wherein said status signal is a device busy or a device acknowledge signal.

38. A method as recited in claim 33, wherein each transaction code further includes a type code identifying whether the transaction code is to be received by a central processing unit, a memory device or a I/O device.

39. A method as recited in claim 38, wherein each transaction code having a type code identifying it for a memory device further includes a device address code for addressing a specific memory location within said device.

40. A method as recited in claim 33 further comprising the steps of:

assigning a priority to each central processing unit and device, and selecting said central processing unit or device with the highest priority for access to said bus in the event of simultaneous access by at least two of said central processing units and devices.

* * * * *